(12) United States Patent
Vaughn et al.

(10) Patent No.: US 12,065,539 B2
(45) Date of Patent: *Aug. 20, 2024

(54) MACROMERS AND COMPOSITIONS FOR PHOTOCURING PROCESSES

(71) Applicant: POLY-MED, INC., Anderson, SC (US)

(72) Inventors: Michael Aaron Vaughn, Anderson, SC (US); Prabhjot Saini, Greenville, SC (US)

(73) Assignee: POLY-MED, INC., Anderson, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/119,400

(22) Filed: Mar. 9, 2023

(65) Prior Publication Data
US 2023/0287171 A1  Sep. 14, 2023

Related U.S. Application Data

(63) Continuation of application No. 17/047,370, filed as application No. PCT/US2019/026098 on Apr. 5, 2019, now Pat. No. 11,639,416.

(60) Provisional application No. 62/660,146, filed on Apr. 19, 2018.

(51) Int. Cl.
C08F 2/46 (2006.01)
B33Y 70/00 (2020.01)
C08F 2/50 (2006.01)
C08F 283/01 (2006.01)
C08F 283/02 (2006.01)
C08F 297/00 (2006.01)
C08G 61/04 (2006.01)
C08G 63/08 (2006.01)
C08G 63/64 (2006.01)
C08G 63/91 (2006.01)
B29C 64/124 (2017.01)
B29K 33/00 (2006.01)
B29K 67/00 (2006.01)
B29K 81/00 (2006.01)
B29K 96/02 (2006.01)
B29K 96/04 (2006.01)
B29K 105/00 (2006.01)
B33Y 10/00 (2015.01)

(52) U.S. Cl.
CPC ............ C08G 63/08 (2013.01); B33Y 70/00 (2014.12); C08F 283/01 (2013.01); C08F 283/02 (2013.01); C08F 297/00 (2013.01); C08G 63/64 (2013.01); C08G 63/912 (2013.01); B29C 64/124 (2017.08); B29K 2033/12 (2013.01); B29K 2067/04 (2013.01); B29K 2081/00 (2013.01); B29K 2096/02 (2013.01); B29K 2096/04 (2013.01); B29K 2105/0002 (2013.01); B33Y 10/00 (2014.12)

(58) Field of Classification Search
CPC ...... C08G 63/08; C08G 63/64; C08G 63/912; C08F 283/01; C08F 283/02; C08F 397/00; B29C 64/124; B33Y 70/00; B33Y 10/00; B29K 2096/04; B29K 2096/02; B29K 2067/04; B29K 2105/0002; B29K 2033/12; B29K 2081/00
USPC ................ 522/64, 71, 1, 189, 184, 6; 520/1
See application file for complete search history.

(56) References Cited

U.S. PATENT DOCUMENTS

| | | | |
|---|---|---|---|
| 4,223,040 A | 6/1980 | Carroll | |
| 4,814,257 A | 3/1989 | Galloway | |
| 6,083,524 A | 7/2000 | Sawhney et al. | |
| 6,200,646 B1 | 3/2001 | Neckers et al. | |
| RE38,721 E | 4/2005 | Jensen et al. | |
| RE38,722 E | 4/2005 | Jensen et al. | |
| 8,629,192 B2 | 1/2014 | Merrigan et al. | |
| 8,821,559 B2 | 9/2014 | Dimauro et al. | |
| 8,851,649 B2 | 10/2014 | Engel et al. | |
| 9,205,601 B2 | 12/2015 | DeSimone et al. | |
| 11,639,416 B2 * | 5/2023 | Vaughn ............ | C08G 63/08 522/64 |
| 2003/0148209 A1 | 8/2003 | Fujita et al. | |
| 2003/0166726 A1 | 9/2003 | Bechtel | |
| 2003/0207204 A1 | 11/2003 | Sugasaki et al. | |
| 2004/0019128 A1 | 1/2004 | Kondo | |

(Continued)

FOREIGN PATENT DOCUMENTS

| | | |
|---|---|---|
| CN | 1185942 A | 7/1998 |
| CN | 102005532 A | 4/2011 |

(Continued)

OTHER PUBLICATIONS

Office Action mailed Dec. 21, 2022 in corresponding JP application 2020-557931.

(Continued)

Primary Examiner — Jessica Whiteley
(74) Attorney, Agent, or Firm — Meunier Carlin & Curfman LLC

(57) ABSTRACT

Compounds and compositions are provided which are useful in additive printing, particularly additive printing techniques such as stereolithography (SLA) wherein a macromer is photopolymerized to form a manufactured article. Representative compounds comprise a polyaxial central core (CC) and 2-4 arms of the formula (A)-(B) or (B)-(A) extending from the central core, where at least one of the arms comprise a light-reactive functional group (Q) and (A) is the free-radical polymerization product from monomers selected from trimethylene carbonate (T) and ε-caprolactone (C), while (B) is the free-radical polymerization product from monomers selected from glycolide, lactide and p-dioxanone.

19 Claims, 7 Drawing Sheets

(56) References Cited

U.S. PATENT DOCUMENTS

| | | | |
|---|---|---|---|
| 2004/0152800 A1* | 8/2004 | Shalaby | C08F 290/06 |
| | | | 522/149 |
| 2005/0149158 A1 | 7/2005 | Hunter et al. | |
| 2005/0175925 A1 | 8/2005 | Johnson et al. | |
| 2006/0240063 A9 | 10/2006 | Hunter et al. | |
| 2011/0092610 A1 | 4/2011 | Habashi et al. | |
| 2015/0002926 A1 | 1/2015 | Matarieh et al. | |
| 2016/0177026 A1 | 6/2016 | Gray, Jr. et al. | |
| 2016/0347624 A1 | 12/2016 | Yoshida et al. | |
| 2017/0150714 A1 | 6/2017 | Schwarz | |
| 2018/0233734 A1 | 8/2018 | Ahn et al. | |
| 2019/0010259 A1 | 1/2019 | Iwata et al. | |
| 2020/0123326 A1 | 4/2020 | Park et al. | |

FOREIGN PATENT DOCUMENTS

| | | | |
|---|---|---|---|
| CN | 105122135 A | 12/2015 | |
| CN | 106818334 A | 6/2017 | |
| CN | 105960379 A | 9/2019 | |
| CN | 112166039 A | 1/2021 | |
| EP | 3774338 A1 | 2/2021 | |
| JP | H02108519 A | 4/1990 | |
| JP | H07033844 A1 | 2/1995 | |
| JP | H0859444 A | 3/1996 | |
| JP | 2001213908 A | 8/2001 | |
| JP | 2003246851 A | 9/2003 | |
| JP | 2003277423 A | 10/2003 | |
| JP | 2004-514778 A | 5/2004 | |
| JP | 2005055682 A | 3/2005 | |
| JP | 2009532511 A | 9/2009 | |
| JP | 2010508428 A | 3/2010 | |
| JP | 2012-139542 A | 7/2012 | |
| JP | 2013018920 A | 1/2013 | |
| JP | 2016025077 A | 2/2016 | |
| JP | 2016527382 A | 9/2019 | |
| KR | 101822151 B1 | 1/2018 | |
| WO | 9812243 A1 | 3/1998 | |
| WO | 0244276 A2 | 6/2002 | |
| WO | 2006031388 A2 | 3/2006 | |
| WO | 2007096708 A2 | 8/2007 | |
| WO | 2008055666 A1 | 5/2008 | |
| WO | 2009049883 A1 | 4/2009 | |
| WO | 2013146081 A1 | 10/2013 | |
| WO | 2014126837 A2 | 8/2014 | |
| WO | 2015021254 A1 | 2/2015 | |
| WO | 2016199611 A1 | 12/2016 | |
| WO | 2017079158 A1 | 5/2017 | |
| WO | 2017159871 A1 | 9/2017 | |
| WO | 2019195763 A1 | 10/2019 | |
| WO | WO-2019195763 A1 * | 10/2019 | B29C 64/124 |

OTHER PUBLICATIONS

Extended European Search Report dated Nov. 12, 2021 for Application No. 19781362.9.

Supplementary European Search Report dated Dec. 16, 2021, for Application No. 19787814.3.

Takao A et al. "Preparation of cross-linked aliphatic polyester and application to thermo-responsive material," Journal of Controlled Release, Elsevier, Amsterdam, NL, vol. 32, No. 1, Nov. 1, 1994, pp. 87-96.

International Search Report and Written Opinion dated Jul. 1, 2019, for International Application No. PCT/US2019/026098.

* cited by examiner

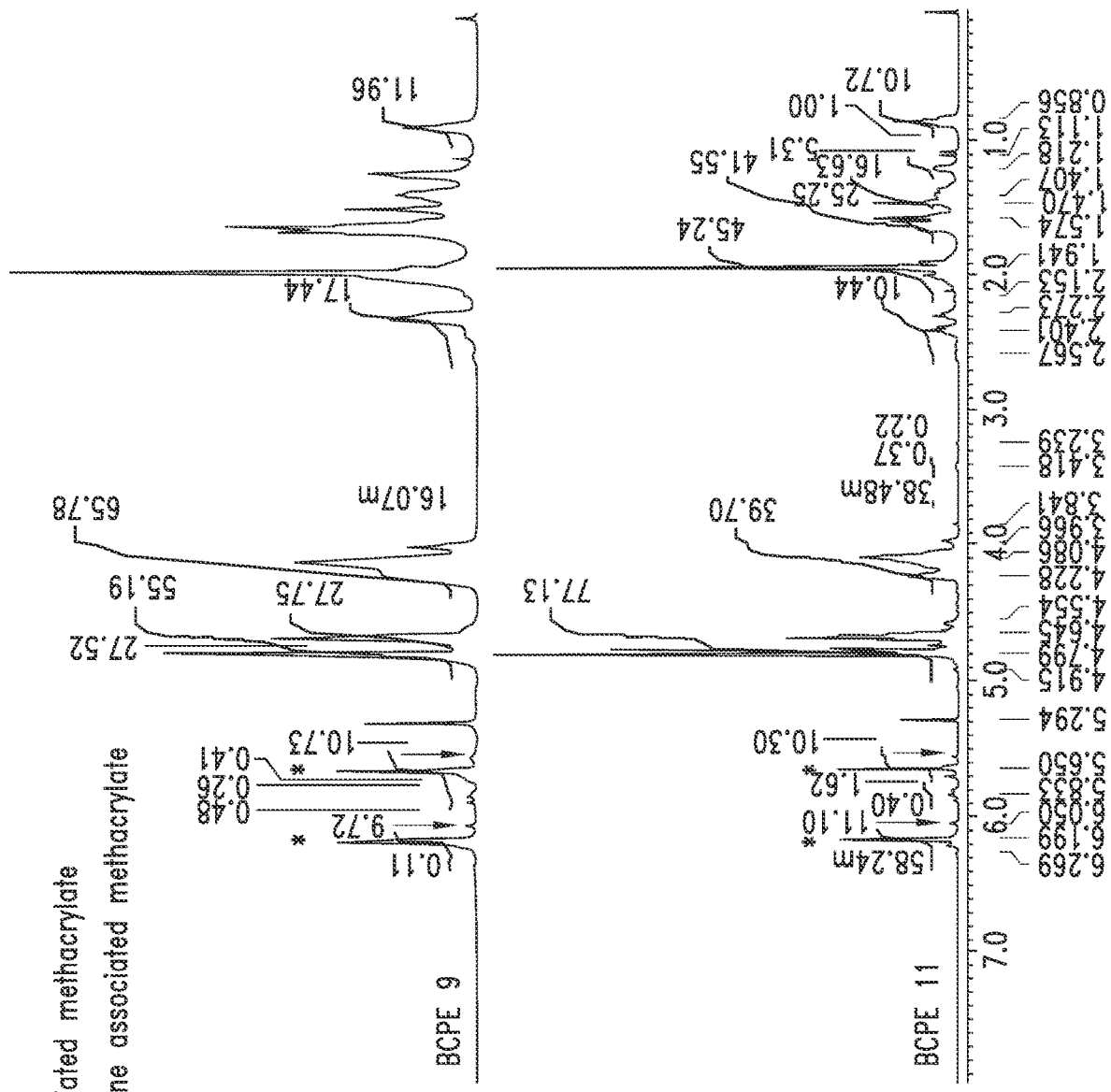

MACROMERS AND COMPOSITIONS FOR PHOTOCURING PROCESSES

CROSS-REFERENCE TO RELATED APPLICATION

This application claims the benefit under 35 U.S.C. § 119(e) of U.S. Provisional Patent Application No. 62/660,146 filed Apr. 19, 2018, which application is incorporated herein by reference in its entirety for all purposes.

FIELD OF THE INVENTION

The present invention relates generally to compounds and compositions useful in a photocuring process such as stereolithography (SLA) wherein a macromer is photopolymerized to form a manufactured article, and related methods.

BACKGROUND

Stereolithography (SLA) is a relatively well developed additive printing technique for preparing three-dimensional (3-D) objects. In stereolithographic methods, light, such as ultraviolet (UV) or visible light, is used to photopolymerize liquid material into designed structures, such as three-dimensional articles, with high accuracy and precision. Thin successive layers are photocrosslinked by UV or visible light, for example, under the direction of a sliced CAD (computer aided design) model.

SLA generally uses a liquid photocrosslinkable polymeric composition that may be referred to as a resin or an ink formulation. The macroscopic properties and degradation profiles of articles produced by SLA depend in part on the polymer chemistry and the processing techniques.

The present disclosure provides compounds and compositions useful in a photocuring process such as stereolithography (SLA), wherein a macromer is photopolymerized to form, for example, a solid surface or a manufactured article.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which in and of itself may also be inventive.

SUMMARY

In brief, in one aspect, the present disclosure provides compounds and compositions useful in a photocuring process. The photocuring process is useful in manufacturing articles, such as medical devices and coatings. An exemplary photocuring process is stereolithography (SLA), which is an additive manufacturing process wherein a macromer is photopolymerized to form a manufactured articles. Another exemplary photocuring process is a coating process whereby a compound and/or composition of the present disclosure is placed on a surface and then cured with actinic radiation (i.e., photopolymerized or photocured) to provide a solid coating on the surface. These photopolymerized/photocured products may generally be referred to herein as articles, coatings, films, materials and the like. Thus, when the present disclosure is exemplified by preparing an article, it should be understood that a coating or other material can likewise be prepared. In one aspect, the articles, coatings etc. are biodegradable.

In one aspect the present disclosure provides biodegradable polymeric materials. The materials may be used to produce articles that have a limited lifetime, such that after some period of time, the article formed from the biodegradable material is no longer present. For example, the material may be a coating on a device, such as a medical device, where the coating degrades after some period of time. In another example, the material may be a used to prepare a medical device, for example, a mesh for tissue repair, so that after a time, some or none of the article is present and tissue repair is accomplished. According to the present disclosure, in one aspect stereolithography may be used to prepare such materials and articles, using, e.g., compounds and compositions as disclosed herein. The present disclosure addresses concerns about photopolymerized materials, such as SLA-produced articles, that come into contact with living entities, include concerns regarding the safety and efficacy of the produced articles, particularly their biocompatibility and cytotoxicity.

In one aspect, disclosed herein are methods and compositions for photopolymerization processes, such as 3-D printing, and for making and using such photopolymerized articles. For example, the present disclosure provides a method for photopolymerization printing an article comprising, a) exposing for a time with light, a photopolymerizable composition comprising at least one photopolymerizable macromer component as disclosed herein; optionally in combination with one or more other components such as at least one photoinitiator component and/or at least one light reflective material component comprising a light reflective material suspended in the composition; and forming a printed article comprising a polymerization product of the photopolymerizable macromer component(s) (i.e., the polymerized macromers).

In one aspect, disclosed herein are methods and compositions for photopolymerization processes, such as a film-forming process including a coating process, and for making and using such photopolymerized materials. For example, the present disclosure provides a method for photopolymerization coating of an article comprising, a) applying a photopolymerizable compounds and/or composition of the present disclosure to a surface, b) exposing for a time with light, the photopolymerizable compounds and/or composition comprising at least one photopolymerizable macromer component as disclosed herein; optionally in combination with one or more other components such as at least one photoinitiator component and/or at least one light reflective material component comprising a light reflective material suspended in the composition; and forming a solid coating comprising a polymerization product of the photopolymerizable macromer component(s) (i.e., the polymerized macromers).

In other aspects, the present disclosure provides the polymerization product of a macromer (which may also be referred to as a prepolymer) where the macromer has been polymerized by, e.g., one or more methods disclosed herein. In addition, the present disclosure provides an article, which may be referred to as a polymeric article, produced from a photopolymerizable compound or composition as disclosed herein, optionally by one or more methods as disclosed herein. The photopolymerized macromer or article may be a nontoxic article. In addition, the article may comprise biodegradable photopolymerized macromer, optionally in admixture with a nontoxic amount of photoinitiator. In one aspect, the polymeric article is biodegradable, in whole or in part, under physiological conditions. However, in an alternative aspect, the polymeric article is not biodegradable under physiological conditions.

Also provided by the present disclosure is a photopolymerizable composition, comprising at least one photopolymerizable macromer component as described herein; optionally in combination with one or more other components such as a diluent, a photoinitiator, a colorant, and/or a light reflective material component. For example, provided herein is a stereolithography photopolymerizable composition, comprising at least one photopolymerizable macromer component optionally in combination with one or more other components such as a diluent, a photoinitiator, a colorant, and/or a light reflective material component.

The present disclosure further provides a continuous liquid interface production photopolymerizable composition, comprising at least one photopolymerizable macromer component as disclosed herein, optionally in combination with one or more other components such as a diluent, a photoinitiator, a colorant, and/or a light reflective material component. The present disclosure additionally provides a photopolymerizable ink composition, comprising, at least one photopolymerizable macromer component as disclosed herein. The ink composition may optionally also contain one or more other components such as a diluent, a photoinitiator, a colorant, and/or a light reflective material component.

In addition, the present disclosure provides a photopolymerizable compound, also referred to herein as a macromer, comprising a polyaxial central core (CC) and 2-4 arms of the formula (A)-(B) or (B)-(A) extending from the central core, where at least one of the arms comprise a light-reactive functional group (Q) and (A) is the polymerization product of monomers selected from trimethylene carbonate (also referred to herein as T, or as TMC) and ε-caprolactone (also referred to herein as caprolactone, or C, or CAP), while (B) is the polymerization product of monomers selected from glycolide, lactide and p-dioxanone. The macromer may be a photopolymerizable macromer component in compositions and methods as disclosed herein, and may be photopolymerized to provide articles.

Furthermore, the present disclosure provides a composition comprising a plurality of compounds, each compound of the plurality comprising a bifunctional central core and either 1 or 2 arms extending from the central core, each arm terminating in a hydroxyl group. The hydroxyl group may also be referred to as the end group. In this case, the central core is a bifunctional core, where at least one of those two functional groups, and as many as both of those functional groups of the central core have reacted with monomers to form arms. These compounds may be used to form photopolymerizable macromers useful in, e.g., the methods and compositions disclosed herein.

The present disclosure also provides a composition comprising a plurality of compounds, each compound of the plurality comprising a trifunctional central core and either 1 or 2 or 3 arms extending from the central core, each arm terminating in a hydroxyl group. In this case, the central core is a trifunctional core, where at least one of those three functional groups, and as many as all three of those functional groups of the central core have reacted with monomers to form arms. These compounds may be used to form photopolymerizable macromers useful in, e.g., the methods and compositions disclosed herein.

The present disclosure additionally provides a composition comprising a plurality of compounds, each compound of the plurality comprising a tetrafunctional central core and either 1 or 2 or 3 or 4 arms extending from the central core, each arm terminating in a hydroxyl group. In this case, the central core is a tetrafunctional core, where at least one of those four functional groups, and as many as all four of those functional groups of the central core have reacted with monomers to form arms. These compounds may be used to form photopolymerizable macromers useful in, e.g., the methods and compositions disclosed herein.

Optionally, any of the compositions of the present disclosure, before they are cured, may contain an effective amount of a photoinitiator, i.e., an amount of photoinitiator which is effective to achieve polymerization of the photopolymerizable compound when the composition is exposed to radiation emitted from a non-natural light source that delivers light of a selected wavelength suitable to activate the photoinitiator.

In an aspect, the present disclosure provides a method of 3D-printing, also known as additive printing, e.g., stereolithography, which comprises providing a polymerizable composition as disclosed herein having a photopolymerizable compound and a photoinitiator, heating that composition to a molten state, depositing that molten state composition into a desired shape, and exposing that desired shape to light which is effective to activate the photoinitiator, in order to photopolymerize the photopolymerizable compound in the polymerizable composition.

The above-mentioned and additional features of the present disclosure and the manner of obtaining them will become apparent, and the disclosure will be best understood by reference to the following more detailed description. All references disclosed herein are hereby incorporated by reference in their entirety as if each was incorporated individually.

This Brief Summary has been provided to introduce certain concepts in a simplified form that are further described in detail below in the Detailed Description. Except where otherwise expressly stated, this Brief Summary is not intended to identify key or essential features of the claimed subject matter, nor is it intended to limit the scope of the claimed subject matter.

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments. Other features, objects and advantages will be apparent from the description, the drawings, and the claims.

BRIEF DESCRIPTION OF THE DRAWINGS

Exemplary features of the present disclosure, its nature and various advantages will be apparent from the accompanying drawings and the following detailed description of various embodiments. Non-limiting and non-exhaustive embodiments are described with reference to the accompanying drawings, wherein like labels or reference numbers refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIG. 1A, FIG. 1B, FIG. 1C and FIG. 1D show proton NMR spectra of triaxial BCPE polymers (BCPE 4, BCPE 6, BCPE 9 and BCPE 11, respectively), where the peaks for the protons of the methacrylate groups are marked: upfield TMC/caprolactone-associated (arrows) and downfield glycolide-associated (asterisks) methacrylate terminal alkenyl protons.

DETAILED DESCRIPTION OF THE INVENTION

Figures 1A, 1B:
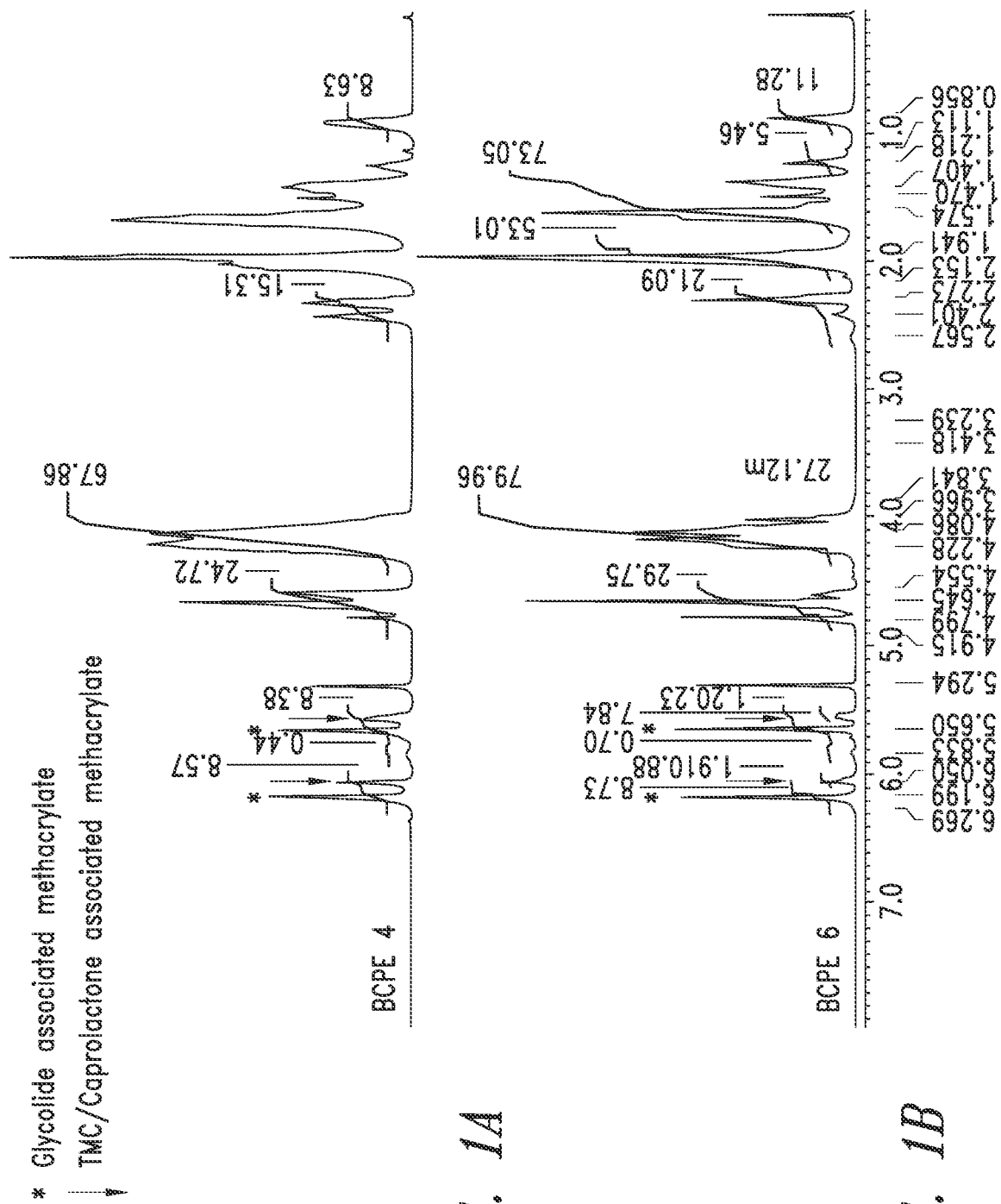

The present invention may be understood more readily by reference to the following detailed description of preferred embodiments of the invention and the Examples included herein.

Briefly stated, in an aspect, the present disclosure provides compounds and compositions which are useful in additive printing, particularly additive printing techniques such as stereolithography (SLA) wherein a macromer is photopolymerized to form a manufactured article. Representative compounds comprise a polyaxial central core (CC) and 2-4 arms of the formula (A)-(B) or (B)-(A) extending from the central core, where at least one of the arms comprise a light-reactive functional group (Q) and (A) is the free-radical polymerization product from monomers selected from trimethylene carbonate (T) and ε-caprolactone (C), while (B) is the free-radical polymerization product from monomers selected from glycolide, lactide and p-dioxanone.

In one aspect the present disclosure provides a photopolymerizable composition. The composition will comprise one or more photopolymerizable compounds, also referred to herein as a macromer or a photopolymerizable macromer or a photopolymerizable macromer component. In one embodiment, the photopolymerizable compound is monofunctional in that there is one mole of photoreactive group per mole of compound. In one embodiment, the photopolymerizable compound is polyfunctional, e.g., difunctional, trifunctional, tetrafunctional, and/or pentafunctional. Higher functional materials with 6-18 reactive sites (i.e., Q groups, as described herein) are additionally contemplated in the present disclosure. In addition, the composition may comprise a relatively low molecular weight species and/or a relatively high molecular weight species. In an aspect, a macromer may comprise reactive groups including photopolymerizable groups, sometimes referred to herein as photoreactive or photocurable groups. In one embodiment, the photoreactive group is an allyl or vinyl-based reactive group, such as the unsaturated functionality of acrylate (including methacrylates), or other allyl and vinyl-based reactive groups. In one embodiment, the photoreactive group is a thiol (—SH) group. In embodiments, the macromer will typically have a molecular weight of less than 250,000 Da, or less than 200,000 Da, or less than 150,000 Da, or less than 100,000 Da, or less than 50,000 Da, or less than 25,000 Da, or less than 20,000 Da, or less than 15,000 Da, or less than 10,000 Da, or less than 9,000 Da, or less than 8,000 Da, or less than 7,000 Da, or less than 6,000 Da, or less than 5,000 Da.

In one embodiment, the present disclosure provides a compound comprising a central core and a plurality, e.g., 2-4, arms extending from the central core, each arm ending (i.e., terminating) in a hydroxyl group. The compound may be represented by the formula CC-[arm]$_n$ where CC represents the central core and n is selected from a number within the ranges of 2-18, or 2-14, or 2-8, or 2-6, or 2-4. Each arm is formed by the polymerization of monomers selected from two groups, the two groups being denoted as group A and group B. Thus, more specifically, in compounds of the present disclosure, CC-[arm]$_n$ may be written as either CC-[(A)p-(B)q-OH]n, or CC-[(B)q-(A)p-OH]n where each of (A)p-(B)q and (B)q-(A)p represents an arm. Optionally, the terminal functional group of the arm may be shown, where an exemplary terminal functional group is hydroxyl. In the formula, A represents the polymerization product of one or more monomers comprising, and optionally selected only from, trimethylene carbonate (T or TMC) and caprolactone (C or CAP), and p represents the number of monomers that have been polymerized to form the polymerization product A, where p is selected from 1-40, or 1-30, or 1-20, or 1-10. In the formula, B represents the polymerization product of one or more monomers comprising, and optionally selected only from, glycolide (G or GLY), lactide (L or LAC) and p-dioxanone (D or DOX), and q represents the number of monomers that have been polymerized to form the polymerization product B, where q is selected from 1-40, or 1-30, or 1-20, or 1-10.

For example, when compounds of the formula CC-[arm]$_n$ are formed from a trifunctional central core, and A is added to CC prior to the addition of B, then compounds of the formula CC-[arm]$_n$ may be written as CC-[(A)p-(B)q-OH]$_3$. If, in this example, A is formed by the polymerization of two Ts and one C, then p would be three and A would be selected from TTT, TTC, TCT, TCC, CCC, CCT, CTC, and CTT, independently within each arm. If, continuing with this example, B is formed by the polymerization of one G, then q would be one and B would be G. In this example, each arm would have a chemical formula selected from TTTG, TTCG, TCTG, TCCG, CCCG, CCTG, CTCG, and CTTG. This exemplary compound of the present disclosure may be written as CC-[arm]$_3$ where each arm is independently selected from TTTG-OH, TTCG-OH, TCTG-OH, TCCG-OH, CCCG-OH, CCTG-OH, CTCG-OH, and CTTG-OH, or alternatively as either CC-[(T,T,C)-(G)-OH]$_3$ or CC-[(T,T,C)$_3$-(G)$_1$-OH]$_3$.

In an aspect, the present disclosure also provides compositions comprising a plurality of compounds, each described by CC-[arm]$_n$. For example, in one embodiment, the present disclosure provides a composition comprising a plurality of compounds, each compound of the plurality comprising a central core and each compound having 2 arms extending from the central core, where each arm terminates in a hydroxyl group, so that each compound may be represented by the formula CC-[arm]$_2$. As another option, the present disclosure provides a composition comprising a plurality of compounds, each compound of the plurality comprising a central core and each compound having 3 arms extending from the central core, where each arm terminates in a hydroxyl group, so that each compound may be represented by the formula CC-[arm]$_3$. As a further option, the present disclosure provides a composition comprising a plurality of compounds, each compound of the plurality comprising a central core and each compound having 4 arms extending from the central core, where each arm terminates in a hydroxyl group, so that each compound may be represented by the formula CC-[arm]$_4$. In the composition, each compound of the plurality will have the same number of arms, and each will have the same ordering of A and B groups selected from CC-[(A)-(B)]$_n$ and CC-[(B)-(A)]$_n$. Thus, in six distinct embodiments (a)-(f), the present disclosure provides (a) a composition comprising a plurality of compounds of formula CC-[(A)-(B)]$_2$; (b) a composition comprising a plurality of compounds of formula CC-[(A)-(B)]$_3$; (c) a composition comprising a plurality of compounds of formula CC-[(A)-(B)]$_4$; (d) a composition comprising a plurality of compounds of formula CC-[(B)-(A)]$_2$; (e) a composition comprising a plurality of compounds of formula CC-[(B)-(A)]$_3$; and (f) a composition comprising a plurality of compounds of formula CC-[(B)-(A)]$_4$.

In one embodiment, the present disclosure provides a composition comprising a plurality of compounds, each compound of the plurality comprising a bifunctional central core and either 1 or 2 arms extending from the central core, each arm terminating in a hydroxyl group. In this case, the central core is a bifunctional core, where at least one of those two functional groups, and as many as both of those functional groups of the central core have reacted with monomers to form arms.

In one embodiment, the present disclosure provides a composition comprising a plurality of compounds, each compound of the plurality comprising a trifunctional central core and either 1 or 2 or 3 arms extending from the central core, each arm terminating in a hydroxyl group. In this case, the central core is a trifunctional core, where at least one of those three functional groups, and as many as all three of those functional groups of the central core have reacted with monomers to form arms.

In one embodiment, the present disclosure provides a composition comprising a plurality of compounds, each compound of the plurality comprising a tetrafunctional central core and either 1 or 2 or 3 or 4 arms extending from the central core, each arm terminating in a hydroxyl group. In this case, the central core is a tetrafunctional core, where at least one of those four functional groups, and as many as all four of those functional groups of the central core have reacted with monomers to form arms.

Each arm in the plurality of compounds may be represented by the formula (A)-(B). Alternatively, each arm in the plurality of compounds may be represented by the formula (B)-(A). When the composition is prepared by reacting the central core with monomers of Group A followed by reacting that reaction product with monomer(s) selected from Group B, then the compounds in the composition will have the formula CC-[(A)-(B)]. However, when the composition is prepared by reacting the central core with monomers of Group B followed by reacting that reaction product with monomer(s) selected from Group A, then the compounds in the composition will have the formula CC-[(B)-(A)].

In one embodiment, the present disclosure provides a composition comprising a plurality of compounds, each compound of the plurality comprising a bifunctional central core and either 1 or 2 arms extending from the central core, each arm terminating in a hydroxyl group. In this case, the central core is a bifunctional core, where at least one of those two functional groups, and as many as both of those functional groups of the central core have reacted with monomers to form arms, so the compounds may generally be represented by one or more of CC-[(A)-(B)]$_1$ and CC-[(A)-(B)]$_2$ where CC is a difunctional core. Alternatively, when Group B monomers are reacted with CC prior to reaction of Group A monomers, then the compounds of the composition may generally be represented by one or more of CC-[(B)-(A)]$_1$ and CC-[(B)-(A)]$_2$ where CC is a difunctional core.

In one embodiment, the present disclosure provides a composition comprising a plurality of compounds, each compound of the plurality comprising a trifunctional central core and either 1 or 2 or 3 arms extending from the central core, each arm terminating in a hydroxyl group. In this case, the central core is a trifunctional core, where at least one of those three functional groups, and as many as all three of those functional groups of the central core have reacted with monomers to form arms, so the compounds may generally be represented by one or more of CC-[(A)-(B)]$_1$ and CC-[(A)-(B)]$_2$ and CC-[(A)-(B)]$_3$ where CC is a trifunctional core. Alternatively, when Group B monomers are reacted with CC prior to reaction of Group A monomers, then the compounds of the composition may generally be represented by one or more of CC-[(B)-(A)]$_1$ and CC-[(B)-(A)]$_2$ and CC-[(B)-(A)]$_3$ where CC is a trifunctional core.

In one embodiment, the present disclosure provides a composition comprising a plurality of compounds, each compound of the plurality comprising a tetrafunctional central core and either 1 or 2 or 3 or 4 arms extending from the central core, each arm terminating in a hydroxyl group. In this case, the central core is a tetrafunctional core, where at least one of those four functional groups, and as many as all four of those functional groups of the central core have reacted with monomers to form arms, so the compounds may generally be represented by one or more of CC-[(A)-(B)]$_1$ and CC-[(A)-(B)]$_2$ and CC-[(A)-(B)]$_3$ and CC-[(A)-(B)]$_4$ where CC is a tetrafunctional core. Alternatively, when Group B monomers are reacted with CC prior to reaction of Group A monomers, then the compounds of the composition may generally be represented by one or more of CC-[(B)-(A)]$_1$ and CC-[(B)-(A)]$_2$ and CC-[(B)-(A)]$_3$ and CC-[(B)-(A)]$_4$ where CC is a tetrafunctional core.

In one aspect, the present disclosure provides multi-arm compounds as described herein, wherein an arm terminates in a Q group, and that Q group is photopolymerizable. In one embodiment, exemplary Q groups may contain a thiol group which is photopolymerizable. In one embodiment, exemplary Q groups may contain a carbon-carbon double bond which is photopolymerizable, e.g., the Q group may comprise vinyl group such as present in an acrylate or methyacrylate group, each having a photopolymerizable carbon-carbon double bond. The Q group containing a photopolymerizable component, e.g., a photopolymerizable thiol or carbon-carbon double bond, may be introduced into a multi-arm compound as described herein by reaction of the terminal hydroxyl group with a suitable reagent. Methods to convert a hydroxyl group to thiol-containing group or a carbon-carbon double bond containing group are generally known and may be utilized to prepare compounds of the present disclosure, where examples are provided herein. While the Q group will contain a photoreactive group, and in particular a photoreactive group that allows for polymerization of the Q-containing macromer, the Q group may also contain additional atoms which influence the photoreactivity of the photoreactive group, e.g., a carbonyl group adjacent to the carbon-carbon double bond as illustrated herein, and/or which were used to introduce the photoreactive group to the macromer, e.g., a succinate ester may be used to introduce a thiol group, as illustrated herein.

For example, to convert a hydroxyl group to a Q group containing a photopolymerizable carbon-carbon double bond, the multi-arm compound having a terminal hydroxyl group may be reacted with a reactive acrylate or methacrylate compound, such as methacrylic anhydride, acrylic anhydride, methacryloyl chloride, or acryloyl chloride.

For example, to convert a hydroxyl group to a Q group containing a photopolymerizable thiol group, a multi-arm compound having a terminal hydroxyl group as disclosed herein may undergo an esterification reaction. One method for esterification is to add stoichiometric amounts of macromer and a mercapto carboxyl acid compound in the presence of a carbodiimide (e.g., N,N'-dicyclohexylcarbodiimide) and a catalyst (e.g., dimethylaminopyridine). Exemplary mercapto carboxyl acids include, but are not limited to, the following compounds: 3-mercaptopropionic acid, thiolactic acid, thioglycolic acid, mercaptobutyric acid, mercaptohexanoic acid, mercaptobenzoic acid, mercaptoundecanoic acid, mercaptooctanoic acid, and n-acetyl cysteine. For example, a multi-arm compound having a terminal hydroxyl group as disclosed herein may be reacted with thiolactic acid, in which case the resulting Q group has the formula —C(═O)—CH$_2$—SH attached to the terminal oxygen of the multi-arm compound.

Another exemplary method of forming thiol functionalized macromer is to first modify the hydroxyl terminated macromer to form terminal carboxylic acid groups. One example of this is to react the hydroxyl terminated macromer with a succinic anhydride. With terminal carboxylic acid groups, the macromer can be reacted with mercapto alcohols by an esterification reaction or with mercapto amines to form amide bonds. Some examples of mercapto alcohols include, but are not limited to, the following: mercapto propanol, mercaptohexanol, mercaptooctanol, and mercapto undecanol. Some examples of mercapto amines include, but are not limited to, the following: cysteine, glutathione, 6-amino-1-hexanethiol hydrochloride, 8-amino-1-octanethiol hydrochloride, and 16-amino-1-hexadecanethiol hydrochloride. For example, a multi-arm compound having a terminal hydroxyl group as disclosed herein may be reacted with succinic anhydride to form an intermediate which is then reacted with cysteine to introduce a terminal thiol group, in which case the resulting Q group has the formula —C(═O)CH$_2$CH$_2$C(═O)NH—C(COOH)—CH$_2$SH attached to the terminal oxygen of the multi-arm compound.

Yet another method for forming thiol functionalized macromer is to react the macromer having terminal hydroxyl groups with a lactone monomer having pendant thiol groups. This would occur in a third step ring opening polymerization.

In an aspect, the present disclosure provides compositions that contain photopolymerizable compounds as identified above, optionally in combination with one or more additional components. The photopolymerizable compounds as identified above have a central core and one or more arms with Q end groups. In one aspect, the macromers present in a composition all contain the same central core. For example, all of the macromer components of a composition are prepared from trimethylolpropane or pentaerythritol. However, in one aspect, a composition of the present disclosure contains a mixture of macromer components, for example, some of the macromer components are triaxial, made from, e.g., trimethylolpropane, and other macromer components of the same composition are tetraaxial, made from, e.g., pentaerythritol.

In one aspect, the present disclosure provides compositions comprising a plurality of compounds as identified above, where each compound of the plurality incorporates the same identity (although not the same number) of monomers used to form the A and B groups. The members of the plurality will differ from one another in the number of monomer units that are present in an arms, and more specifically in the number of polymerized monomer units present in the A groups and/or the number of polymerized monomer units present in the B groups. For example, the A groups will be formed from monomers selected from trimethylene carbonate (T) and caprolactone (C), although the number of T-derived units and the number of C-derived units in an arm may be different among the arms of a compound, and between the arms of different compounds within the plurality of compounds present in the composition. Likewise, the B groups will be formed from monomers selected from glycolide (G), lactide (L) and p-dioxanone (D), although the number of G-derived units and the number of L-derived units and the number of D-derived units in an arm may be different among the arms of a compound, and between the arms of different compounds within the plurality of compounds present in the composition.

For example, if the composition comprises a plurality of compounds each represented by formula CC-[arm]$_n$, and each arm is written as (A)-(B) rather than (B)-(A), then the composition comprises a plurality of compounds each having the formula CC-[(A)-(B)]$_2$. The members of the plurality will differ in the number of monomer units used to form the A and B groups. Thus, if each compound of the plurality is represented by the formula CC-[(A)p-(B)q]$_2$, the sum of p and q may be 2 (in which case each of p and q is 1), or the sum may be 3 (in which case one of p and q is 1 and the other of p and q is 2), or the sum may be 4 (in which case either each of p and q is 2, or else one of p and q is 1 and the other of p and q is 3).

For example, when compounds of the formula CC-[arm]$_n$ are formed from a trifunctional central core, and A is added to CC prior to the addition of B, then compounds of the formula CC-[arm]$_n$ may be written as CC-[(A)p-(B)q-OH]$_3$. If, in this example, A is formed by the polymerization of two Ts and one C, then p would be three and A would be selected from TTT, TTC, ICI, TCC, CCC, CCT, CTC, and CTT, independently within each arm. If, continuing with this example, B is formed by the polymerization of one G, then q would be one and B would be G. In this example, each arm would have a chemical formula selected from TTTG, TTCG, TCTG, TCCG, CCCG, CCTG, CTCG, and CTTG. This exemplary compound of the present disclosure may be written as CC-[arm]$_3$ where each arm is independently selected from TTTG-OH, TTCG-OH, TCTG-OH, TCCG-OH, CCCG-OH, CCTG-OH, CTCG-OH, and CTTG-OH, or alternatively as either CC-[(T,T,C)-(G)-OH]$_3$ or CC-[(T,T,C)$_3$-(G)$_1$-OH]$_3$.

As mentioned previously, each arm is formed by the polymerization of monomers selected from two groups, the two groups being denoted as group A and group B. Thus, more specifically, in compounds of the present disclosure, CC-[arm]$_n$ may be written as either CC-[(A)p-(B)q-OH]$_n$, or CC-[(B)q-(A)p]$_n$ where each of (A)p-(B)q and (B)q-(A)p represents an arm. In the formula, A represents the polymerization product of one or more monomers comprising, and optionally selected only from, trimethylene carbonate (T) and caprolactone (C), and p represents the number of monomers that have been polymerized to form the polymerization product A, and is selected from 1-40, or 1-30, or 1-20, or 1-10. In the formula, B represents the polymerization product of one or more monomers comprising, and optionally selected from, glycolide (G), lactide (L) and p-dioxanone (D), and q represents the number of monomers that have been polymerized to form the polymerization product B, and is selected from 1-40, or 1-30, or 1-20, or 1-10.

The compounds of the present disclosure having hydroxyl end groups, i.e., arms that terminate in hydroxyl groups, are useful in the preparation of the corresponding photopolymerizable compounds, and compositions containing such photopolymerizable compounds. The hydroxyl end group may be converted to a photopolymerizable group by techniques known in the art and illustrated herein. These photopolymerizable groups are referred to herein by the shorthand notation "Q".

In one embodiment, the present disclosure provides a compound comprising a central core and a plurality, e.g., 2-4, arms extending from the central core, each arm terminating in a photopolymerizable group (Q). The compound may be represented by the formula CC-[arm-Q]$_n$ where CC represents the central core and n is selected from a number within the ranges of 2-18, or 2-14, or 2-8, or 2-6, or 2-4. Each arm is formed by the polymerization of monomers selected from two groups, the two groups being denoted as group A and group B. Thus, more specifically, in compounds of the present disclosure, CC-[arm]$_n$ may be written as either CC-[(A)p-(B)q-Q]n, or CC-[(B)q-(A)p-Q]n where each of (A)p-(B)q and (B)q-(A)p represents an arm. Optionally, the terminal functional group of the arm may be shown, where Q generally represents a photoreactive terminal functional group. In the formula, A represents the polymerization product of one or more monomers comprising, and optionally selected only from, trimethylene carbonate (T) and caprolactone (C), and p represents the number of monomers that have been polymerized to form the polymerization product A, where p is selected from 1-40, or 1-30, or 1-20, or 1-10. In the formula, B represents the polymerization product of one or more monomers comprising, and optionally selected only from, glycolide (G), lactide (L) and p-dioxanone (D), and q represents the number of monomers that have been polymerized to form the polymerization product B, where q is selected from 1-40, or 1-30, or 1-20, or 1-10.

In embodiments, the present disclosure provides a photopolymerizable compound, and compositions containing such compounds, wherein the compound is described by one of: the compound is or comprises a structure CC-[A-B-Q]n and n is 2; the compound is or comprises a structure CC-[A-B-Q]n and n is 3; the compound is or comprises a structure CC-[A-B-Q]n and n is 4; the compound is or comprises a structure CC-[B-A-Q]n and n is 2; the compound is or comprises a structure CC-[B-A-Q]n and n is 3; the compound is or comprises a structure CC-[B-A-Q]n and n is 4.

Optionally, the compound has four arms, a molecular mass of less than 40,000 g/mol, or less than 20,000 g/mol, and is a solid at room temperature. Optionally, the compound has three arms, a molecular mass of less than 15,000 g/mol, and is a liquid at room temperature. Optionally, the compound has two arms, a molecular mass of less than 5,000 g/mol, and is a liquid at room temperature.

In one embodiment, the photopolymerizable compounds of the present disclosure have relatively short arms, e.g., 1-10 monomer residues/arm. A monomer residue, as used herein, refers to the polymerization product of the monomer, i.e., the structure that the monomer has after that monomer has been incorporated into a polymer and is thus providing a monomer residue in that polymer. In one embodiment, when the compounds of the disclosure are used in additive printing, those compounds should be in a fluid state: either the compounds themselves are fluid or the compounds are dissolved in a solvent and/or diluent to provide a fluid composition. If the arms are too long, a composition containing the compound will typically be too viscous to be useful in additive printing such as SLA, unless the composition contains a lot of solvent or diluent to dilute the compound, in which case the additive printing process may need to utilize an undesirably large amount of solvent. Advantageously, when the arms are relatively short, the compounds themselves may be fluid at the application temperature of the additive printing process, where the application temperature may be above room temperature such that the compound must be heated to achieve a molten state, or they may be dissolved in a solvent at a relatively high concentration and still provide a low viscosity solution.

In optional embodiments, the compounds and compositions of the present disclosure containing such compounds, can be described by one or more of the following features which characterize the A region (also referred to as a block) of the compound: have a block A which comprises residues formed from trimethylene carbonate (TMC or T), i.e., which are the polymerization product or residue of TMC; have a block A which comprises residues formed from caprolactone (CAP or C); have a block A which comprises residues formed from both TMC and CAP; at least 90% of the residues in block A are residues formed from TMC or CAP; the compound comprises 1-45, or 2-45 residues formed from TMC; the compound comprises 1-15 or 2-15 residues formed from TMC; the compound comprises 1-10 or 2-10 residues formed from TMC; region A has a molecular weight of from 102-2500 g/mol; region A has a molecular weight of 102-1000 g/mol; region A has a molecular weight of 102-900 g/mol; each A region comprises 2-45 monomer residues; each A region comprises 2-15 monomer residues; each A region comprises 2-10 monomer residues.

In optional embodiments, the compounds and compositions of the present disclosure containing such compounds, can be described by one or more of the following features which characterize the B block (also referred to as a region) of the compound: each B block comprise 1-45 or 2-45 monomer residues; each B block comprise 1-15 or 2-15 monomer residues; each B block comprises 1-10 or 2-10 monomer residues.

The compounds may also, or alternatively, be described by one or more of the following: the compound has a molecular mass of less than 40,000 g/mol; the compound has a molecular mass of less than 25,000 g/mol; the compound has a molecular mass of less than 10,000 g/mol.

The photopolymerizable compositions of the present disclosure may optionally be described by having a viscosity at room temperature of less than 50,000 cP; or having a viscosity at room temperature of less than 30,000 cP; or having a viscosity at room temperature of less than 20,000 cP.

The compositions may contain a diluent. The diluent may be reactive or non-reactive. A reactive diluent undergoes a photopolymerization reaction when exposed to light (UV or visible light) while a non-reactive diluent is inert to such light exposure. An exemplary reactive diluent is PEG-diacrylate (PEG-DA or PEGDA).

The following are numbered exemplary embodiments of the present disclosure.

1) A photopolymerizable compound comprising a polyaxial central core (CC) and 2-4 arms of the formula (A)-(B) or (B)-(A) extending from the central core, where at least one of the arms comprise a light-reactive functional group (Q), (A) is the ring-opening polymerization product from monomers selected from trimethylene carbonate (T) and ε-caprolactone (C), and (B) is the ring-opening polymerization product from monomers selected from glycolide, lactide and p-dioxanone.
2) A light-curable composition comprising one or more photopolymerizable compounds of embodiment 1, optionally also containing a photoinitiator.
3) A light-reactive polyaxial macromer compound comprising a central core (CC) and 2-4 arms extending from the central core, where at least one of the arms comprises a light-reactive functional group (Q) and a block copolymer comprising blocks A and B; wherein
   a. block A comprises residues formed from at least one of, i.e., one or both of, trimethylene carbonate (TMC) and ε-caprolactone (CAP); and
   b. block B comprises residues formed from at least one of, i.e., one, two or all three of, glycolide, lactide and p-dioxanone.
4) A light-reactive composition comprising one or more macromer compounds of embodiment 3.
5) A prepolymer compound of the photopolymerizable compound of embodiment 1, wherein the central core (CC) is joined to (A) of one or more arms of formula (A)-(B), and (B) has a hydroxyl end group.
6) A prepolymer compound of the photopolymerizable compound of embodiment 1, wherein the central core (CC) is joined to (B) of one or more arms of formula (B)-(A), and (A) has a hydroxyl end group.
7) The compounds and compositions of embodiments 1-6 wherein each of (A) and (B) contains at least one but no more than 10 monomer residues.
8) The compounds and compositions of embodiments 1-6 wherein each of (A) and (B) contains at least one but no more than 8 monomer residues.
9) The compounds and compositions of embodiments 1-6 wherein each of (A) and (B) contains at least one but no more than 6 monomer residues.
10) The compounds and compositions of embodiments 1-6 wherein each of (A) and (B) contains at least one but no more than 4 monomer residues.
11) The compounds and compositions of embodiments 1-10 wherein the compound has a molecular weight of less than 5,000 g/mol.
12) The compounds and compositions of embodiments 1-10 wherein at least 90 weight percent of compounds having a central core and arms with (A) and (B) regions, have a molecular weight of less than 5,000 g/mol.
13) The compounds and compositions of embodiments 1-10 wherein the compound has a molecular weight of less than 4,000 g/mol.
14) The compounds and compositions of embodiments 1-10 wherein at least 90 weight percent of compounds having a central core and arms with (A) and (B) regions, have a molecular weight of less than 4,000 g/mol.
15) The compounds and compositions of embodiments 1-10 wherein the compound has a molecular weight of less than 3,000 g/mol.
16) The compounds and compositions of embodiments 1-10 wherein at least 90 weight percent of compounds having a central core and arms with (A) and (B) regions, have a molecular weight of less than 3,000 g/mol.

The photopolymerizable compounds as described herein having photopolymerizable Q groups, and the compositions of the present disclosure that include such compounds, will undergo polymerization upon sufficient exposure to light of appropriate wavelength, optionally in the presence of a photoinitiator, and further optionally in the presence of other components. The choice of appropriate wavelength, time of exposure, and curing agent identity and amount, is selected in view of identity and quantity of the Q group in the compounds and compositions, as is conventional in the art. Photopolymerization is sometimes referred to radiation curing, in which case the photoinitiator may be referred to as the curing agent.

A photoinitiator refers to an organic (carbon-containing) molecule that creates reactive species when exposed to radiation. In one embodiment the photoinitiator creates a radical reactive species, as opposed to, e.g., a cationic or anionic reactive species. Photoinitiators are well known components for the preparation of photopolymers which find use in photo-curable coatings, adhesives and dental restoratives.

In order for the photoinitiator to successfully cure the light-reactive polymer, it is necessary that the absorption bands of the photoinitiator overlap with the emission spectrum of the light source used for curing. Optionally, photopolymerizable compositions disclosed herein comprise at least one photoinitiator that absorbs a wavelength of light in a range between about 10 nm to about 770 nm, or between about 100 nm to about 770 nm, or between about 200 nm to about 770 nm, and all wavelengths thereinbetween the stated range. In an aspect, a photoinitiator component comprises a photoinitiator that absorbs a wavelength of light of greater than or equal to 300 nm, up to about 770 nm. In an aspect, a photoinitiator component comprises a photoinitiator that absorbs a wavelength of light of greater than or equal to 365 nm, up to about 770 nm. In an aspect, a photoinitiator component comprises a photoinitiator that absorbs a wavelength of light of greater than or equal to 375 nm, up to about 770 nm. In an aspect, a photoinitiator component comprises a photoinitiator that absorbs a wavelength of light of greater than or equal to 400 nm, up to about 770 nm. The choice of wavelength will depend on the identity of the photoinitiator. Suppliers of commercially available photoinitiators indicate the appropriate wavelength for that particular photoinitiator.

Free radical generating photoinitiators may be used to achieve polymer curing according to the present disclosure. These photoinitiators may be used to cure thiol-containing polymers as well as double bond-containing polymers such as polymer that contain acrylate and/or methacrylate functionality. There are two types of free-radical generating photoinitiators, designated as Type I and Type II photoinitiators, which may be used according to the present disclosure.

Type I photoinitiators are unimolecular free-radical generators; that is upon the absorption of UV-visible light a specific bond within the initiator's structure undergoes homolytic cleavage to produce free radicals. Homolytic cleavage is a bonding pair of electron's even scission into to free radical products. Examples of homolytic cleavage in several common classes of Type I photoinitiators: benzoin ethers, benzyl ketals, α-dialkoxy-aceto-phenones, α-hydroxy-alkyl-phenones, and acyl phosphine oxides. Exemplary commercially available Type I photoinitiators, available from, for example, BASF, BASF SE, Ludwigshafen, Germany, include, but are not limited to, Irgacure™ 369, Irgacure™ 379, Irgacure™ 907, Darocur™ 1173, Irgacure™ 184, Irgacure™ 2959, Darocur™ 4265, Irgacure™ 2022, Irgacure™ 500, Irgacure™ 819, Irgacure™ 819-DW, Irgacure™ 2100, Lucirin™ TPO, Lucirin™ TPO-L, Irgacure™ 651, Darocur™ BP, Irgacure™ 250, Irgacure™ 270, Irgacure™ 290, Irgacure™ 784, Darocur™ MBF, hand Irgacure™ 754, lithium phenyl-2,4,6-trimethylbenzoylphosphinate, magnesium phenyl-2,4,6-trimethylbenzoylphosphinates, and sodium phenyl-2,4,6-trimethylbenzoylphosphinates Type II photoinitiators require a co-initiator, usually an alcohol or amine, functional groups that can readily have hydrogens abstracted, in addition to the photoinitiator. The absorption of UV-visible light by a Type-II photoinitiator causes an excited electron state in the photoinitiator that will abstract a hydrogen from the co-initiator, and in the process, splitting a bonding pair of electrons. Benzophenone, thioxanthones, and benzophenone-type photoinitiators are the most common Type II photoinitiators. Further examples of some common Type II photoinitiators include riboflavin, Eosin Y, and camphorquinone. Once the free-radicals are generated, the polymerization mechanism is similar to any free-radical polymerization process.

In an aspect, a photoinitiator component in a composition of the present disclosure comprises a Type I photoinitiator. In an aspect, a photoinitiator component in a composition of the present disclosure comprise a Type II photoinitiator. In an aspect, a combination of a Type I and a Type II photoinitiator is present in photopolymerization composition of the present disclosure.

In any of the photopolymerizable compounds and composition as described herein, Q may be a carbon-carbon double bond, e.g., a vinyl group. Exemplary vinyl groups are an acrylate group and a methacrylate group. In additional aspects, the photopolymerizable compound having one or more Q groups undergoes photopolymerization when exposed to light having a wavelength of 300-450 nm, or 300-425 nm, or 350-450 nm, or 350-425 nm, or 365-405 nm, as examples. In one embodiment, the compound and composition undergoes photopolymerization when exposed to UV radiation.

In any of the photopolymerizable compounds and composition as described herein, Q may be a thiol group. In additional aspects, the photopolymerizable compound having one or more Q groups undergoes photopolymerization when exposed to light having a wavelength of 300-450 nm, or 300-425 nm, or 350-450 nm, or 350-425 nm, or 365-405 nm, as examples. In one embodiment, the compound and composition undergoes photopolymerization when exposed to UV radiation.

In general, thiol free radical polymerizations using a photoinitiator require a much higher concentration of photoinitiator than is needed when the Q group has a photopolymerizable carbon-carbon double bond. With thiol groups, the photoinitiator can initiate the thiol groups but two thiol groups can only polymerize when two thiyl radicals meet. Additionally, the joining of two thiyl radicals is a termination of the radical groups which is why a high concentration of photoinitiator is required. When the photopolymerizable group is or comprises a carbon-carbon double bond, e.g., a vinyl group, one free radical can initiate and propagate a large number of vinyl groups before termination. Accordingly, when photopolymerization proceeds through thiol groups, it is beneficial to have a relatively high density of thiol groups. The lower the concentration of thiol end groups the less probability of both the creation of thiyl radicals and the joining of two thiyl radicals for the polymerization to occur. From this perspective, low molecular weight (i.e. preferably <5000 Da, more preferably <3000 Da, and even more preferably <2000 Da) multi-arm thiol compounds are preferable for the photopolymerization processes of the present disclosure.

In any of the photopolymerizable compositions as described herein, there may be some amount, typically a small amount, of compound having only a single arm of formula -(A)-(B)-Q or —(B)-(A)-Q. In one embodiment, the single arm compound provides less than 20 wt % of the total weight of compounds having Q groups. In other embodiments, the single arm compound provides less than 15 wt %, or less than 10 wt %, or less than 5 wt %, or less than 4 wt %, or less than 3 wt %, or less than 2 wt % of the total weight of compounds having Q groups. In these compounds, the central core may be derived from any of a bifunctional central core (bifunctional initiator), or a trifunctional central core (a trifunctional initiator), or a tetrafunctional central core (a tetrafunctional initiator).

In any of the photopolymerizable compositions as described herein, there may be some amount of compound(s) selected from those comprising the formula CC-Q, CC-A-Q, and CC—B-Q. A compound comprising the formula CC-Q will have a central core directly bonded to a photopolymerizable group Q. A compound comprising the formula CC-A-Q will have an arm formed from monomer residues from Group A but not from Group B, and this arm will terminate in a Q group and be attached to a central core CC. A compound comprising the formula CC—B-Q will have an arm formed from monomer residues from Group B but not from Group A, and this arm will terminate in a Q group and be attached to a central core CC. In these compounds, the central core may be derived from any of a bifunctional central core (bifunctional initiator), or a trifunctional central core (a trifunctional initiator), or a tetrafunctional central core (a tetrafunctional initiator).

In any of the photopolymerizable compositions as described herein, there may be some amount of one or more compounds wherein some of the arms terminate in a Q end group but other of the arms terminate in a hydroxyl end group. Such compounds may result when there is incomplete conversion of the hydroxyl end groups to the corresponding reactive Q groups. Exemplary compounds of this type may be described by the formula {[(B)q-(A)p]n-}m-CC—{[(A)p-(B)q-Q]}r, which denotes compounds wherein "m" of the arms terminate with hydroxyl end groups and "r" of the arms terminate in Q end groups, where the total of m and r is the functionality of the central core (CC). For example, m may be 1 and r may be 1, when the central core is bifunctional. As another example, m may be 1 and r may be 2 when the central core is trifunctional. In yet another example, may be 2 and r may be 1 when the central core is trifunctional. The corresponding situation may occur with compounds of the formula {[(A)q-(B)p]n-}m-CC—{[(B)p-(A)q-Q]}r.

In addition to a photoinitiator, a colorant, such as a dye, may be added to the photopolymerizable printing formulations described herein. The addition of a dye can achieve the purpose of tailoring a formulation to a desired color. However, dyes for non-toxic and biocompatible formulations are typically used at concentrations of 2 wt. % or less (for example, see PCT/US2016/059910, which is incorporated herein for its teaching of polymerizable compositions and use of dyes). In the case of absorbable devices, most dyes have been regulated by the FDA to contain 0.1-0.3 wt % as shown in the D&C Violet additive for most absorbable suture products. The combination of high dye concentrations and high photoinitiator concentrations provide much of the pronounced toxicity of 3-D photoprintable compositions, and particularly the resulting photoprinted articles.

In an aspect, the present disclosure provides a stereolithography (SLA) ink composition. The composition includes a photopolymerizable compound as disclosed herein, also referred to as a photopolymerizable macromer. Optionally, the ink composition includes at least one photoinitiator component, typically in a total concentration of less than 2 wt %, or less than 1.5 wt %, or less than 1 wt %, or less than 0.9 wt %, or less than 0.8 wt %, or less than 0.7 wt %, or less than 0.6 wt %, or less than 0.5 wt %, or less than 0.25 wt %, or less than 0.1 wt % based on the total weight of polymerizable macromer.

Also optionally, the SLA ink composition contains at least one light reflective material component comprising a light reflective material suspended in the composition, where the light reflective material component modulates the light dose of the composition when compared to the light dose of the composition without the light reflective material. Suitable light reflective materials for this and other embodiments disclosed here are disclosed in U.S. Provisional Patent Application Ser. No. 62/653,584, entitled Methods and Compositions for Photopolymerizable Additive Manufacturing, filed Apr. 6, 2018 by Applicant Poly-Med, Inc., having inventors M. A. Vaughn and P. Saini.

Other optional components of the ink composition are a reactive diluent, a non-reactive diluent, a solvent, a stabilizer, a thixotropic material, colorant, a tracer material and a conductive material. For example, an additive may be a dye. A printed article made with an SLA ink of the present disclosure may be colored due to the presence of a dye, or may have any desired attribute such as having at least a portion of the article that is, but is not limited to, fluorescent, radioactive, reflective, flexible, stiff, pliable, breakable, or a combination thereof.

Photopolymerizable compositions disclosed herein are made by combining the desired components, typically with stirring to achieve a homogeneous composition. The desired components may be mixed using a homogenizer. For example, a photopolymerizable composition disclosed herein may be prepared by combining ingredients such as those identified above, including a photopolymerizable macromer and a photoinitiator. Optionally, the desired components may include a dispersion agent to aid in suspension. The listed components may optionally be heated prior to mixing. The listed components may optionally be placed under vacuum to remove gas bubbles.

Methods disclosed herein comprise methods for using photopolymerizable compositions to make articles, particularly non-toxic and biodegradable articles. For example, a composition disclosed herein may be used as photopolymerizable or photocurable ink or resin in 3-D printing methods. For example, a composition disclosed herein may be used as photopolymerizable or photocurable ink or resin in 3-D printing method of stereolithography (SLA).

The present disclosure provides a method for SLA printing an article which comprises exposing for a time with light, a photopolymerizable composition comprising at least one photopolymerizable macromer compound as disclosed herein; and at least one photoinitiator component, typically in a total concentration of less than 1.0 wt %. Any of the photopolymerizable compositions disclosed herein may be used in the method for SLA printing an article. For example, the photopolymerizable composition may comprise a reactive diluent or a nonreactive diluent. A reactive diluent is a diluent that participates in the polymerization reaction, for example, the reactive diluent is polymerized with, for example, a macromer. A photopolymerizable composition of the present disclosure may comprise a stabilizer, for example, a free radical stabilizer.

A method for printing an article by SLA according to the present disclosure may comprise a secondary curing step comprising curing the printed article. A secondary curing step involves exposing at least a portion of the printed article so that at least a portion of the printed article undergoes a second polymerization reaction. For example, a portion of an article may be exposed to the same or different wavelength radiation as was used in the first polymerization step, and photoinitiators, which may be the same or different photoinitiators as those reacting in the first polymerization step, may be activated to cause previously unpolymerized or partially polymerized reactive groups to undergo polymerization reactions and to polymerize. A secondary curing step may change properties of the printed article. For example, the printed article, after the initial printing step, is soft and pliable throughout. After exposing the exterior of the printed article to a secondary curing step, using a different wavelength radiation, the exterior of the printed article is hard and not pliable.

A method for printing an article by SLA according to the present disclosure may comprise pre- and/or post-treatments of a printed article. For example, the printed article may be rinsed after printing, before a secondary curing step, after a secondary printing step or before or after each of these steps.

A printed article is the article resulting after a SLA 3-D printing period is completed. The printed article may be a structure or a portion of a structure. The printed article may be in the form of a film, such as a coating that is printed onto a surface. As used herein, the term printing is used to mean contacting a polymeric composition with a surface and causing the polymeric composition to further polymerize. Printing may involve contacting a polymeric composition with a surface that is then exposed to UV and/or visible light so that the polymeric composition undergoes further polymerization. The surface that the polymeric composition contacts may be any surface including a polymerized layer of the polymeric composition.

A printed article may or may not contain residual amounts of components of a photopolymerizable composition. For example, a printed article may comprise diluent or photopolymerized diluent, or photoinitiator. In an aspect, a printed article or a photopolymerizable composition may have additives. Additives may include thixotropic materials, colorants, tracer materials or conductive materials. For example, an additive may be a dye. A printed article may be colored due to the presence of a dye, or may have any desired attribute such as having at least a portion of the article that is, but is not limited to, fluorescent, radioactive, reflective, flexible, stiff, pliable, breakable, or a combination thereof.

A method of SLA printing an article may comprise a photopolymerizable composition comprising monomers or macromers that are capable of undergoing polymerization, such as monomers or macromers that have functional groups capable of undergoing photopolymerization reactions to form oligomers and/or polymers. In an aspect, macromers and monomers may comprise ethylenically unsaturated aliphatic or aromatic reactive groups or end groups. Disclosed macromers and monomers are functional in the disclosed methods herein.

Methods for SLA printing an article comprise photopolymerizing photopolymerizable compositions at light wavelength from about 10 nm to about 770 nm. As used herein, UV radiation has a wavelength of from about $10^{-400}$ nm, while visible radiation has a wavelength of 390-770 nm. In an aspect, photopolymerizable compositions comprising a light reflective material component photopolymerizes in a shorter exposure time than a photopolymerizable composition without the light reflective material component under the same polymerization conditions.

A method of printing an article using SLA in a device for printing by SLA comprises photopolymerizable compositions comprising a photoinitiator component. A photoinitiator component may comprise one or more photoinitiators, and may also comprise other materials, for example, a diluent, excipient, inhibitors, or other solutions. In an aspect, a photoinitiator component may be in a concentration of from about 0.05 wt % to about 5.0 wt % of the photopolymerizable composition. In an aspect, a photoinitiator component may be in a concentration of less than 0.50 wt % of the photopolymerizable composition. In an aspect, a photoinitiator component may be 0.25 wt % of the photopolymerizable composition. In an aspect, a photoinitiator component may be less than 0.25 wt % of the photopolymerizable composition. In an aspect, a photoinitiator component may be 0.10 wt % of the photopolymerizable composition. In an aspect, a photoinitiator component may be less than 0.10 wt % of the photopolymerizable composition.

A method of printing an article using SLA in a device for printing by SLA comprises photopolymerizable compositions comprising at least one photoinitiator that absorbs at a wavelength of light from about 10 nm to about 770 nm. In an aspect, a photoinitiator absorbs at a wavelength of light of greater than or equal to 300 nm. In an aspect, a photoinitiator absorbs at a wavelength of light of than or equal to 365 nm. In an aspect, a photoinitiator absorbs at a wavelength of light of greater than or equal to 375 nm. In an aspect, a photoinitiator absorbs at a wavelength of light of greater than or equal to 400 nm. A method of printing an article using SLA in a device for printing by SLA comprises photopolymerizable compositions comprising at least one photoinitiator component that comprises a photoinitiator that is a Type I, Type II, a cationic photoinitiator or a combination thereof.

A method of printing an article using SLA in a device for printing by SLA comprises photopolymerizing or curing a photopolymerizable composition at a depth of less than 150 microns. In an aspect, a method disclosed herein comprises photopolymerizing or curing a photopolymerizable composition at a depth of from about 5 microns to about 50 microns, and all depths thereinbetween.

A method of printing an article using SLA in a device for printing by SLA comprises photopolymerizable compositions comprising a light reflective material component comprising a light reflective material that is absorbable in physiological conditions. In an aspect, a light reflective material component comprises a light reflective material that is biocompatible for biological organisms. In an aspect, a light reflective material component comprises a light reflective material that polymerizes with at least one of a photopolymerizable macromer, a diluent, a light reflective material, or a combination thereof.

The present disclosure comprises a polymeric article formed upon polymerization of a composition by the methods disclosed herein and from the compositions disclosed herein.

The present disclosure comprises an article, additionally referred to herein as a printed article, made by the methods disclosed herein from the compositions disclosed herein. In an aspect, an article may be a medical device. In an aspect, an article may be a portion of a medical device. In an aspect, an article may be porous. In an aspect, an article may be biodegradable under physiological conditions. In an aspect, a biodegradable article may have a degradation time of about three days to about five years. In an aspect, an article may not be biodegradable. In an aspect, a portion of an article may be biodegradable and a second portion may be nonbiodegradable or have a different degradation time from the degradation time of the first portion or the rest of the article.

The article may be drug-eluting, for example, all or a portion of an article may elute a bioactive agent that was comprised in the photopolymerizable composition. Examples of such bioactive agents include, but are not limited to, fibrosis-inducing agents, antifungal agents, antibacterial agents and antibiotics, anti-inflammatory agents, anti-scarring agents, immunosuppressive agents, immunostimulatory agents, antiseptics, anesthetics, antioxidants, cell/tissue growth promoting factors, anti-neoplastic, anticancer agents and agents that support ECM integration.

Examples of fibrosis-inducing agents include, but are not limited to talcum powder, metallic beryllium and oxides thereof, copper, silk, silica, crystalline silicates, talc, quartz dust, and ethanol; a component of extracellular matrix selected from fibronectin, collagen, fibrin, or fibrinogen; a polymer selected from the group consisting of polylysine, poly(ethylene-co-vinylacetate), chitosan, N-carboxybutyl-chitosan, and RGD proteins; vinyl chloride or a polymer of vinyl chloride; an adhesive selected from the group consisting of cyanoacrylates and crosslinked poly(ethylene glycol)-methylated collagen; an inflammatory cytokine (e.g., TGFβ, PDGF, VEGF, bFGF, TNFα, NGF, GM-CSF, IGF-a, IL-1, IL-1β, IL-8, IL-6, and growth hormone); connective tissue growth factor (CTGF); a bone morphogenic protein (BMP) (e.g., BMP-2, BMP-3, BMP-4, BMP-5, BMP-6, or BMP-7); leptin, and bleomycin or an analogue or derivative thereof. Optionally, the device may additionally comprise a proliferative agent that stimulates cellular proliferation. Examples of proliferative agents include: dexamethasone, isotretinoin (13-cis retinoic acid), 17-β-estradiol, estradiol, 1α,25-dihydroxyvitamin $D_3$, diethylstibesterol, cyclosporine A, L-NAME, all-trans retinoic acid (ATRA), and analogues and derivatives thereof. (see US 2006/0240063, which is incorporated by reference in its entirety). Examples of antifungal agents include, but are not limited to, polyene antifungals, azole antifungal drugs, and Echinocandins. Examples of antibacterial agents and antibiotics include, but are not limited to, erythromycin, penicillins, cephalosporins, doxycycline, gentamicin, vancomycin, tobramycin, clindamycin, and mitomycin. Examples of anti-inflammatory agents include, but are not limited to, non-steriodal anti-inflammatory drugs such as ketorolac, naproxen, diclofenac sodium and fluribiprofen. Examples of anti-scarring agents include, but are not limited to cell-cycle inhibitors such as a taxane, immunomodulatory agents such as serolimus or biolimus (see, e.g., paras. 64 to 363, as well as all of US 2005/0149158, which is incorporated by reference in its entirety).

Examples of immunosuppressive agents include, but are not limited to, glucocorticoids, alkylating agents, antimetabolites, and drugs acting on immunophilins such as ciclosporin and tacrolimus. Examples of immunostimulatory agents include, but are not limited to, interleukins, interferon, cytokines, toll-like receptor (TLR) agonists, cytokine receptor agonist, CD40 agonist, Fc receptor agonist, CpG-containing immunostimulatory nucleic acid, complement receptor agonist, or an adjuvant. Examples of antiseptics include, but are not limited to, chlorhexidine and tibezonium iodide. Examples of anesthetic include, but are not limited to, lidocaine, mepivacaine, pyrrocaine, bupivacaine, prilocalne, and etidocaine. Examples of antioxidants include, but are not limited to, antioxidant vitamins, carotenoids, and flavonoids. Examples of cell growth promoting factors include, but are not limited to, epidermal growth factors, human platelet derived TGF-β, endothelial cell growth factors, thymocyte-activating factors, platelet derived growth factors, fibroblast growth factor, fibronectin or laminin. Examples of antineoplastic/anti-cancer agents include, but are not limited to, paclitaxel, carboplatin, miconazole, leflunamide, and ciprofloxacin. Examples of agents that support ECM integration include, but are not limited to, gentamicin The articles of the present disclosure may contain a mixture of bioactive agents in order to obtain a desired effect. Thus, for example, an antibacterial and an anti-inflammatory agent may be combined in a single article to provide combined effectiveness.

In addition, the present disclosure provides the following exemplary numbered embodiments:

1. A method for photopolymerization printing an article comprising,
   a) exposing for a time with light, a photopolymerizable composition comprising
      i. at least one photopolymerizable macromer component;
      iii. at least one photoinitiator component; and
   b) forming a printed article comprising a polymerized form of the macromer component;
   wherein the photopolymerizable macromer component comprises a central core (CC) and a plurality of arms extending from the central core, where all or substantially all of the arms terminate in a photopolymerizable group (Q); where each arm is formed by the polymerization of monomers selected from two groups, denoted as group A and group B; to provide region A and region B, respectively, in the arms, where region A represents the polymerization product of one or more monomers comprising, and optionally selected only from, trimethylene carbonate (T) and caprolactone (C), and region B represents the polymerization product of one or more monomers comprising, and optionally selected only from, glycolide (G), lactide (L) and p-dioxanone (D).
2. The method of embodiment 1 wherein the photopolymerizable macromer compound is represented by the formula CC-[arm-Q]n where CC represents the central core and n is selected from a number within the ranges of 2-18, and each arm is formed by the polymerization of monomers selected from two groups, the two groups being denoted as group A and group B to provide macromers of the formula CC-[(A)p-(B)q-Q]n, or CC-[(B)q-(A)p-Q]n where each of (A)p-(B)q and (B)q-(A)p represents an arm, and where p is selected from 1-40 and q is selected from 1-40.
3. The method of embodiment 2 wherein the photopolymerizable macromer component is described by the formula CC-[(A)p-(B)q-Q]n.
4. The method of embodiment 2 wherein the photopolymerizable macromer component is described by the formula CC-[(B)q-(A)p-Q]n.
5. The method of embodiment 2 wherein the photopolymerizable composition comprises a first photopolymerizable macromer component that is biaxial and a second photopolymerizable macromer component that is polyaxial but not biaxial, e.g., is triaxial or tetraaxial.
6. The method of embodiment 2 wherein the photopolymerizable composition comprises a first photopolymerizable macromer component that is triaxial and a second photopolymerizable macromer component that is polyaxial but is not triaxial, e.g., is biaxial or tetraaxial.
7. The method of embodiment 2 wherein the photopolymerizable composition comprises a first photopolymerizable macromer component that is tetraaxial and a second photopolymerizable macromer component that is polyaxial but is not tetraaxial, e.g., is biaxial or triaxial.
8. The method of any of embodiments 1-7, wherein the composition further comprises a light reflective material component to provide an increased polymerization rate at the surface of a photopolymerizable composition where the light contacts the composition in comparison to the same photopolymerizable composition without the light reflective material component.
9. The method of any of embodiments 1-8, wherein the photoinitiator component is in a total concentration of less than 1 wt %.
10. The method of any of embodiments 1-9, wherein the photopolymerizable composition further comprises a reactive diluent.
11. The method of any of embodiments 1-10, wherein the photopolymerizable composition further comprises a nonreactive diluent.
12. The method of any of embodiments 1-11, wherein the photopolymerizable composition further comprises a stabilizer, which is optionally a free radical stabilizer.
13. The method of any of embodiment 1-12, further comprising a secondary curing step comprising curing the printed article.
14. The method of any of embodiments 1-13 wherein the light wavelength used for photopolymerization is from 10 nm to 700 nm.
15. The method of any of embodiments 1-14 wherein the printed article is biodegradable and is non-toxic to a subject that has been exposed to the printed article.
16. A polymer formed by the method of any of embodiments 1-15.
17. An article produced by the method of any of embodiments 1-15.
18. The article of embodiment 17, wherein the article is a medical device.
19. The article of embodiment 17, wherein the article is at least a portion of a medical device.
20. The article of embodiment 17, wherein the article is porous.
21. The article of embodiment 17, wherein the article is biodegradable under physiological conditions.
22. The article of embodiment 17, wherein the article completely degrades under physiological conditions within a period of from about 3 days to about 5 years.
23. The article of embodiment 17, wherein the article is not biodegradable.

24. The article of embodiment 17, wherein the article is drug-eluting.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

It is also to be understood that as used herein and in the appended claims, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended, and those skilled in the art will recognize, that the invention embraces and is also thereby described in terms of any individual member and any subgroup of members of the Markush group, and Applicants reserve the right to revise the application or claims to refer specifically to any individual member or any subgroup of members of the Markush group.

The following Examples are offered by way of illustration and not by way of limitation. Chemicals were obtained from commercial sources, e.g., MilliporeSigma (St. Louis, Mo., USA).

EXAMPLES

Example 1

Preparation of Compounds of the Present Disclosure Generally Described by the Formula CC-[Arm-OH]

Table 1 identifies 16 prepolymers, uniquely labeled as BCPE 1 through BCPE 16, which may generally be described as having or including compounds of the general formula CC-[arm-OH] according to the present disclosure. The term arm-OH refers to an arm that terminates in a hydroxyl group (OH), i.e., has a hydroxyl end group.

When the prepolymer includes compounds that include the formula CC-[(A)-(B)], i.e., when an arm is formed from residues of monomers from Group A (any one or more of trimethylene carbonate and ε-caprolactone) which are proximal to (adjacent to) the central core, and residues of monomers from Group B (any one or more of glycolide, lactide and ρ-dioxanone) which are the distal to (furthest away from) the central core, such prepolymers may be prepared by reacting a functionalized central core, also referred to herein as an initiator, with one or more monomers from Group A, followed by reacting that reaction product (referred to herein as a prepolymer precursor) with one or more monomers from Group B. The result is a central core bonded to one or more arms, each arm being hydroxyl terminated and having the formula -(A)-(B)—OH. The preparation of such a prepolymer is illustrated in Example 1A below, where the central core is trifunctional and the functionalized central core/initiator is provided by trimethylolpropane.

Example 1A—Preparation of Triaxial BCPE6 Prepolymer

Trimethylene carbonate (1.4 mol) and ε-caprolactone (1.4 mol) are co-polymerized using trimethylolpropane (0.6 mol) as initiator and stannous octoate ($7.0 \times 10^{-1}$ mol) as catalyst, at 130° C. for 72 hours to provide a prepolymer precursor. Glycolide (1.1 mol) and additional stannous octoate ($2.1 \times 10^{-4}$ mol) were combined with the prepolymer precursor at 160° C. for 3 hours to provide a prepolymer having polyglycolide grafts on the ends of the prepolymer precursor. The amorphous liquid prepolymer, thus obtained, was devolatilized and characterized by $^1$H NMR spectroscopy, rheometry (viscosity 17,300 cP at shear rate 105 s$^{-1}$), differential scanning calorimetry (Tg=-45° C.) and gel permeation chromatography (Mn=1884 Da, PDI=1.80).

When the prepolymer includes compounds that include the formula CC-[(B)-(A)], i.e., when residues of monomers from Group B (glycolide, lactide and p-dioxanone) are proximal to (adjacent to) the central core, and residues of monomers from Group A (trimethylene carbonate and caprolactone) are the distal to (furthest away from) the central core, such prepolymers may be prepared by reacting a functionalized central core with one or more monomers from Group B, followed by reacting that reaction product with one or more monomers from Group A. The result is a central core bonded to one or more arms, each arm being hydroxyl terminated and having the formula —(B)-(A)-OH. The preparation of such a prepolymer is illustrated in Example 1B below, where the central core is trifunctional and the functionalized central core is provided by trimethylolpropane.

Example 1B—Preparation of Triaxial BCPE4 Prepolymer

In a first step, glycolide (1.1 mol) was polymerized with trimethylolpropane (0.6 mol) as initiator and stannous octoate ($7 \times 10^{-5}$ mol) as catalyst, at 160° C. for 3 hours to provide a prepolymer precursor. After completion of the first step, a mixture of equimolar amounts of trimethylene carbonate (1.4 mol) and ε-caprolactone (1.4 mol) was co-polymerized onto ends of the prepolymer precursor by adding more stannous octoate ($2 \times 10^{-4}$ mol) and reacting at 130° C. for 72 hours. The resulting amorphous liquid prepolymer was devolatilized and characterized by 1H NMR spectroscopy, rheometry (viscosity 17,300 cP at shear rate 105 s$^{-1}$), differential scanning calorimetry (Tg=-45° C.) and gel permeation chromatography (Mn=1909 Da, PDI=1.83).

Following the procedures outlined in Examples 1A and 1B, additional polyester prepolymers were synthesized as described in Table 1. All linear samples were synthesized with 1,3-propanediol as the bifunctional initiator, all trifunctional prepolymers were prepared with trimethylolpropane, and 4-arm block copolyester compositions were initiated by pentaerythritol as the tetrafunctional initiator. In Table 1, M/I refers to the total moles of monomers (M) used to prepare the arms divided by the moles of initiator (I) (also referred to as the functionalized central core) for each of the copolyesters identified in Table 1. Also in Table 1, M/C refers to the total moles of monomers (M) used to prepare the arms divided by the total moles of catalyst (C) used to prepare each of the copolyester prepolymers identified in Table 1. Each of the prepolymers of Table 1 contains a B region, which may either be proximal to the central core (in which case the location of the B region is identified as being central to the prepolymer) or it is distal to the central core (in which case the location of the B region is identified as being at the end of the prepolymer, and in which case the B region terminates in a hydroxyl group).

Selected molecular weight results obtained by gel permeation chromatography (GPC) for selected prepolymers prepared as illustrated in Example 1 are provided in Table 2. In Table 2, Mn refers to number average molecular weight, Mw refers to weight average molecular weight, PDI refers to polydispersity (i.e., Mw/Mn), and Da refers to Daltons.

9Q through BCPE 12Q, which may generally be described as having or including compounds of the general formula CC-[arm-Q]according to the present disclosure. The designation arm-Q refers to an arm that terminates in a light-reactive group (Q), such as an acrylate or methacrylate group.

The methacrylated prepolymers of Table 3 were prepared from the corresponding prepolymers of Table 1, that is, BCPE 4Q was prepared from BCPE 4, BCPE 5Q was prepared from BCPE 5, etc.

Methacrylation of BCPE 6 to form BCPE 6Q

The BCPE 6 prepolymer (0.131 moles) was reacted with an excess of methacrylic anhydride, in the presence of 3-tert-2-butyl-4-hydroxyanisole (6.724×10−4 moles), at 120° C. for 24 hours. Residual methacrylic anhydride and methacrylic acid by-products were removed from the crude polymer using a rotary evaporator. The resulting amorphous liquid polymer was characterized using $^1$H NMR spectroscopy, rheometery (viscosity 16,400 cP at shear rate 105 s$^{-1}$), differential scanning calorimetry (Tg=−38° C.) and gel permeation chromatography (Mn=2162 Da, PDI=1.75). Each BCPE formulation was methacrylated following the procedure outlined above. The composition and molecular weight results are outlined in Table 3, and the dynamic viscosities are reported in Table 4. In Table 3, for BCPE 5Q, 40.15 in the TMC column is the total mole % of TMC plus 1,3-propanediol used to make BCPE 5Q.

TABLE 1

Block copolyester (BCPE) prepolymer compositions

| Prepolymer Name | M/I | M/C | Initiator Type | Glycolide/ Lactide/p- Dioxanone Segment | Composition (mol %) | | | | |
|---|---|---|---|---|---|---|---|---|---|
| | | | | | Glycolide | TMC | Caprolactone | D,L-lactide | p-Dioxanone |
| BCPE 1 | 14.3 | 14,333 | Triaxial | Center | 2.3 | 48.8 | 48.8 | — | — |
| BCPE 2 | 7 | 14,333 | Triaxial | Center | 2.3 | 48.8 | 48.8 | — | — |
| BCPE 3 | 3.5 | 14,333 | Triaxial | Center | 2.3 | 48.8 | 48.8 | — | — |
| BCPE 4 | 7 | 14,000 | Triaxial | Center | 28.6 | 35.7 | 35.7 | — | — |
| BCPE 5 | 7 | 11,666 | Linear | Center | 14.3 | 42.9 | 42.9 | — | — |
| BCPE 6 | 7 | 14,000 | Triaxial | End | 28.6 | 35.7 | 35.7 | — | — |
| BCPE 7 | 7 | 11,666 | Linear | End | 14.3 | 42.9 | 42.9 | — | — |
| BCPE 8 | 7 | 14,000 | 4-arm | Center | 42.9 | 28.6 | 28.6 | — | — |
| BCPE 9 | 7 | 14,000 | Triaxial | End | 50 | 25 | 25 | — | — |
| BCPE 10 | 7 | 11,666 | Linear | End | 25 | 37.5 | 37.5 | — | — |
| BCPE 11 | 7 | 14,000 | Triaxial | End | 75 | 12.5 | 12.5 | — | — |
| BCPE 12 | 7 | 11,666 | Linear | End | 50 | 25 | 25 | — | — |
| BCPE 13 | 7 | 14,000 | Triaxial | End | — | 25 | 25 | 50 | — |
| BCPE 14 | 7 | 14,000 | Triaxial | End | — | 25 | 25 | — | 50 |
| BCPE 15 | 7 | 11,666 | Linear | End | — | 37.5 | 37.5 | 25 | — |
| BCPE 16 | 7 | 11,666 | Linear | End | — | 37.5 | 37.5 | — | 25 |

TABLE 2

Block copolyester (BCPE) molecular weights (Mn and Mw) and polydispersity indices (PDI)

| Prepolymer Name | Mn (Da) | Mw (Da) | PDI |
|---|---|---|---|
| BCPE 4 | 1909 ± 29 | 3490 ± 16 | 1.83 ± 0.03 |
| BCPE 5 | 2311 ± 23 | 3766 ± 18 | 1.63 ± 0.02 |
| BCPE 6 | 1884 ± 15 | 3386 ± 36 | 1.79 ± 0.02 |
| BCPE 7 | 2168 ± 141 | 3628 ± 87 | 1.68 ± 0.08 |
| BCPE 9 | 1554 ± 37 | 2569 ± 29 | 1.65 ± 0.03 |
| BCPE 10 | 1785 ± 30 | 2208 ± 73 | 1.24 ± 0.02 |
| BCPE 11 | 1389 ± 8 | 1829 ± 9 | 1.32 ± 0.01 |
| BCPE 12 | 1606 ± 5 | 2410 ± 17 | 1.50 ± 0.01 |

Example 2

Preparation of Methacrylated Compounds of the Present Disclosure Generally Described by the Formula CC-[Arm-Q]

Table 3 identifies 8 Q-functionalized prepolymers, uniquely labeled as BCPE 4Q through BCPE 7Q and BCPE

TABLE 3

Composition and molecular weight results of methacrylated BCPE formulations

| Polymer Name | Composition (mol %) | | | | Mn | Mw | PDI |
|---|---|---|---|---|---|---|---|
| | Glycolide | TMC | Caprolactone | Methacrylate | | | |
| BCPE 4Q | 19.91 | 28.43 | 24.66 | 27.00 | — | — | — |
| BCPE 5Q | 9.93 | 40.15 | 32.87 | 17.05 | 2648 ± 82 | 3999 ± 56 | 1.51 ± 0.03 |
| BCPE 6Q | 19.94 | 24.36 | 28.87 | 27.43 | 2162 ± 14 | 3793 ± 24 | 1.75 ± 0.02 |
| BCPE 7Q | 9.89 | 39.38* | 32.52 | 18.21 | 2328 ± 32 | 3551 ± 14 | 1.53 ± 0.02 |
| BCPE 9Q | 35.06 | 15.51 | 22.16 | 27.87 | 1585 ± 55 | 2946 ± 52 | 1.86 ± 0..03 |
| BCPE 10Q | 17.3 | 36.97* | 27.78 | 17.95 | 2140 ± 11 | 2548 ± 13 | 1.19 ± 0.004 |
| BCPE 11Q | 50.23 | 9.34 | 13.60 | 26.83 | 2125 ± 4 | 2575 ± 6 | 1.21 ± 0.003 |
| BCPE 12Q | 32.02 | 26.00* | 20.98 | 21.01 | 1670 ± 8 | 2588 ± 12 | 1.55 ± 0.01 |

TABLE 4

Dynamic viscosity of methacrylated BCPE formulations

| Polymer Name | Viscosity at 105 s$^{-1}$ shear rate (cP) |
|---|---|
| BCPE 4Q | 12,700 ± 141 |
| BCPE 5Q | 6,747 ± 35 |
| BCPE 6Q | 16,400 ± 346 |
| BCPE 7Q | 5,493 ± 38 |

Block Structural Analysis of Methacrylated BCPE Formulations

Figures 2A, 2B:
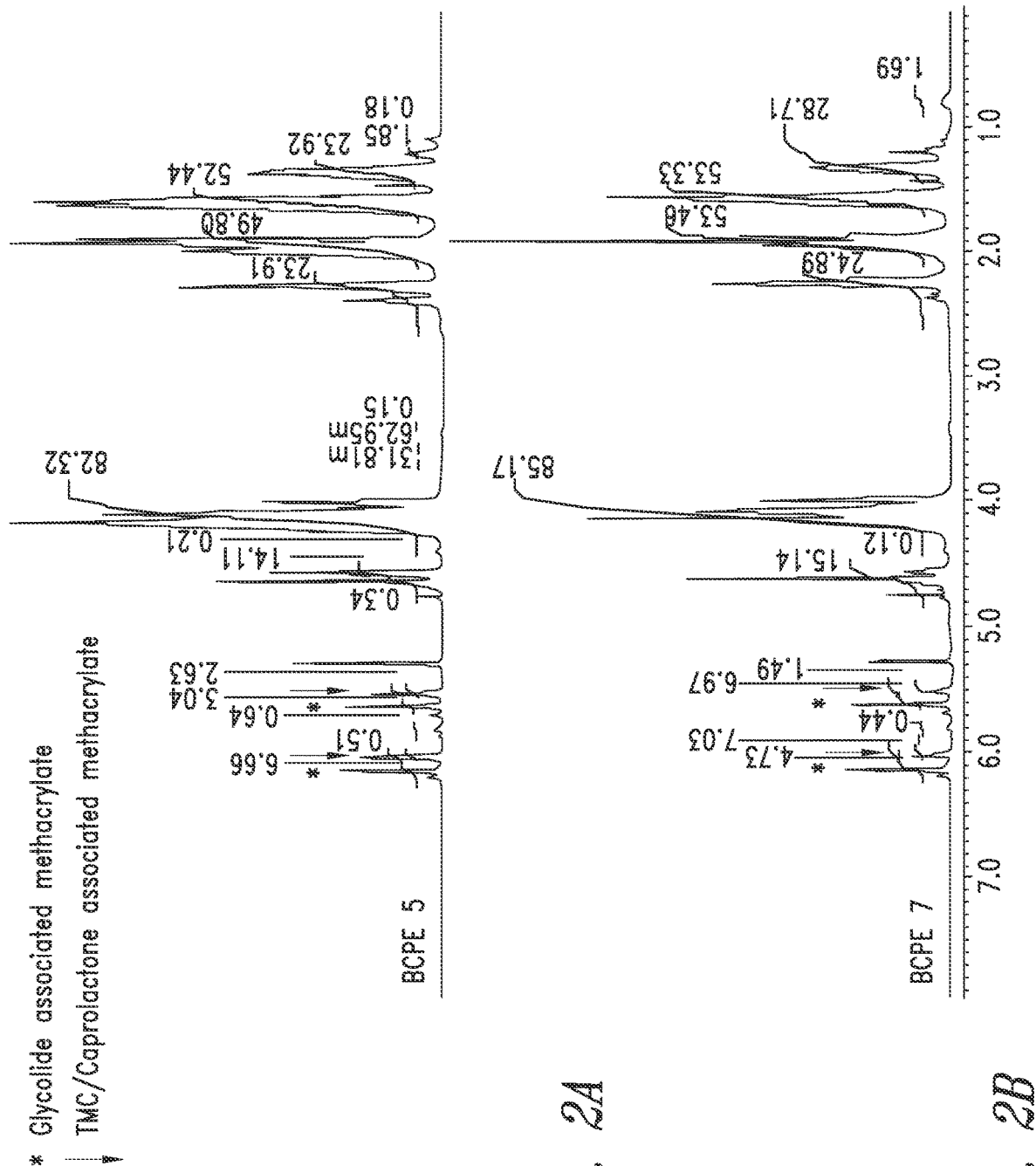
FIG. 2A, FIG. 2B, FIG. 2C and FIG. 2D show proton NMR spectra of linear BCPE polymers (BCPE 5, BCPE 7, BCPE 10 and BCPE 12, respectively), where the peaks for the protons of the methacrylate groups: upfield TMC/caprolactone-associated (arrows) and downfield glycolide-associated (asterisks) methacrylate terminal alkenyl protons.
Figures 2C, 2D:
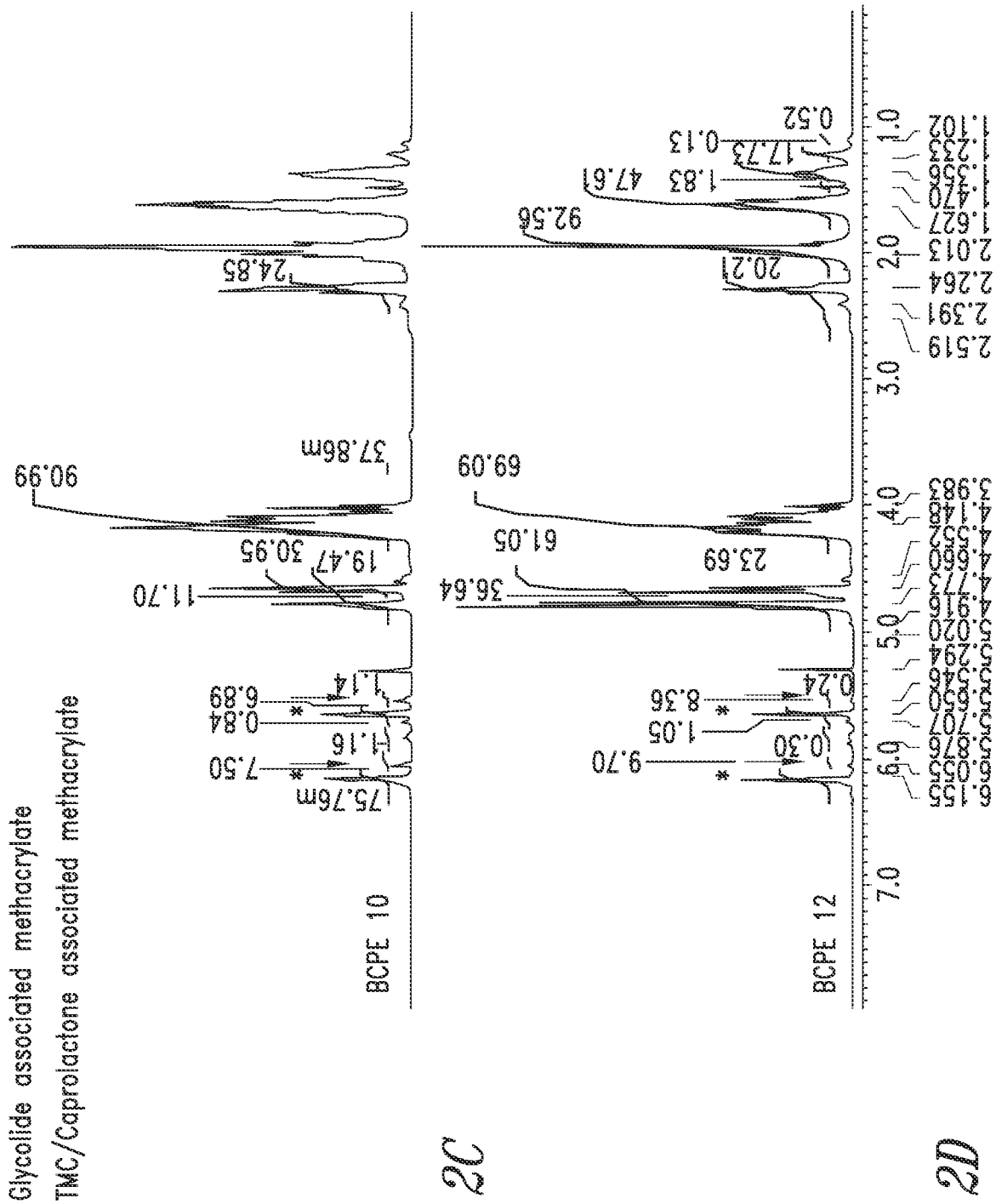

Proton NMR spectra of methacrylated BCPE polymers were obtained using JEOL-300 MHz NMR spectrometer in deuterated dichloromethane (20 mg/ml) and analyzed using JEOL Delta software. The spectra for triaxial BCPE prepolymers are presented in FIGS. 1A, 1B, 1C and 1D, while spectra for linear BCPE prepolymers are presented in FIGS. 2A, 2B, 2C and 2D. Peaks associated with the alkenyl protons of the methacrylate groups appear between δ values of 5.5 to 6.3 ppm on the spectra. Depending on the monomer residue that is adjacent to the methacrylate group, the location of the proton peaks is slightly shifted. The methacrylate groups adjacent to glycolide residues (also referred to herein as glycolide-associated) appear further downfield than their counterparts adjacent to either of the TMC or caprolactone residues (also referred to herein as TMC or caprolactone associated).

The peak area for protons of the glycolide-associated methacrylate groups, and hence the number of methacrylate groups next to glycolide residues, is higher for BCPE 6Q and BCPE 7Q which have glycolide residue end grafts, compared to BCPE 4Q and BCPE 5Q which have glycolide residue center blocks. The area of glycolide-associated methacrylate peaks progressively increases with an increase in the glycolide residue content in the prepolymers while the peaks for methacrylate linked to TMC and caprolactone diminish to negligible levels when the percentage of glycolide residues in the polymer is 50% or above.

Example 3

Preparation of Film by Photopolymerization of BCPE 6Q 15 g of methacrylated BCPE 6 (BCPE 6Q) was weighed out and mixed with 0.5 wt. % 2,4,6-trimethylbenzoylphenyl phosphinate (i.e. Irgacrure® TPO-L). The mixture was cast between two UV transparent sheets with shims allowing for a film thickness of 0.75 mm. Using a Blak-Ray™ B-100, a 365 nm 100 W light source was applied approximately 13 mm from the mold for 5 minutes to provide a crosslinked film BCPE 6X.

Essentially the same photopolymerization procedure was followed using BCPE 1Q, BCPE 4Q, BCPE 5Q, BCPE 7Q, BCPE 9Q and BCPE 10Q as the starting material, to provide the corresponding crosslinked films BCPE 1X, BCPE 4X, BCPE 5X, BCPE 7X, BCPE 9X and BCPE 10X.

The resulting crosslinked polymer films were characterized using differential scanning calorimetry (Tg=−13° C.) and mechanical testing. Each BCPE films was tested according ASTM D882. Briefly, thin films were cut into 75 mm length and 7.5 mm width. Samples were tested at room temperature (~21° C.) between fixed grips on a MTS Synergie 200 electromechanical mechanical testing machine. The gauge length for testing was 25.4 mm and the crosshead speed was 2.5 mm/min. The results for select formulations are provided in Table 5.

TABLE 5

Mechanical properties of photopolymerized BCPE Q films

| Polymer Name | Peak Stress (MPa) | Strain at Break (%) | Modulus (MPa) |
|---|---|---|---|
| BCPE 1X | 2.00 ± 0.39 | 15.2 ± 3.8 | 18.7 ± 0.7 |
| BCPE 4X | 28.8 ± 1.9 | 28.1 ± 9.1 | 337.1 ± 38.2 |
| BCPE 5X | 5.2 ± 0.8 | 23.0 ± 4.4 | 21.1 ± 1.0 |
| BCPE 6X | 29.3 ± 2.4 | 37.5 ± 14.5 | 351.8 ± 48.9 |
| BCPE 7X | 6.6 ± 1.2 | 27.4 ± 5.0 | 27.6 ± 0.9 |
| BCPE 9X | 47.4 ± 7.1 | 16.3 ± 1.7 | 575.0 ± 33.9 |
| BCPE 10X | 5.9 ± 0.7 | 31.3 ± 4.2 | 21.4 ± 0.8 |

Example 4

Accelerated Degradation of Photopolymerized 3DP Films

Figure 3:
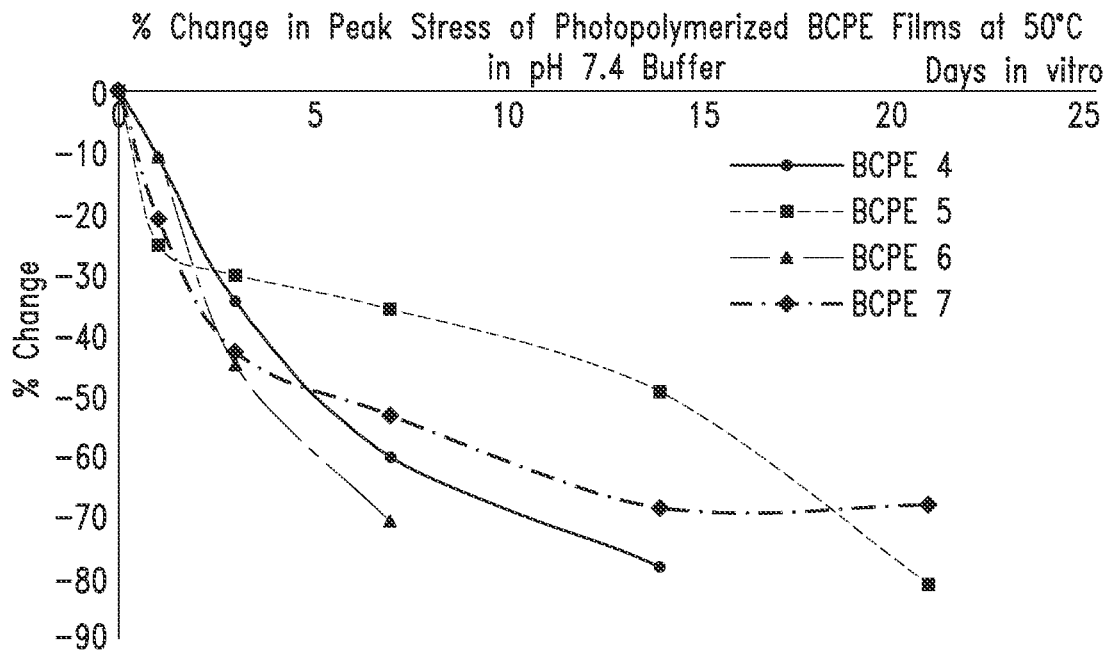
FIG. 3 shows percent change in strength over time for BCPE 4-BCPE 7 photopolymerized polymer films of the present disclosure.
Figure 4:
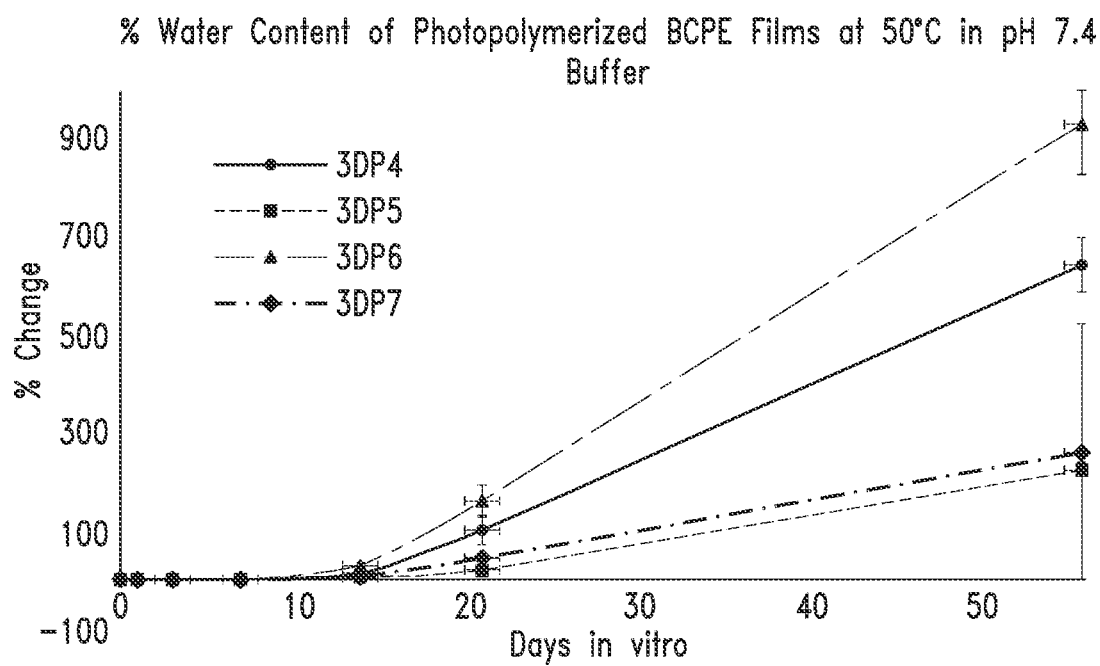
FIG. 4 shows percent water content over time for BCPE 4-BCPE 7 photopolymerized polymer films of the present disclosure.
Figure 5:
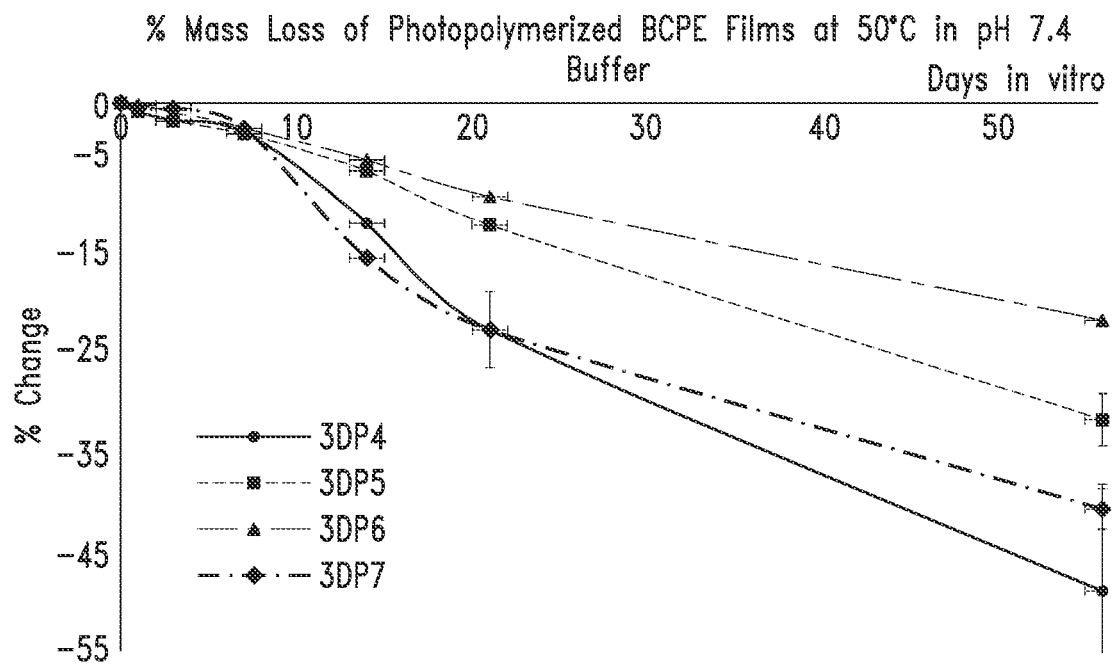
FIG. 5 shows percent mass loss over time of BCPE 4-BCPE 7 photopolymerized polymer films of the present disclosure.
Figure 6:
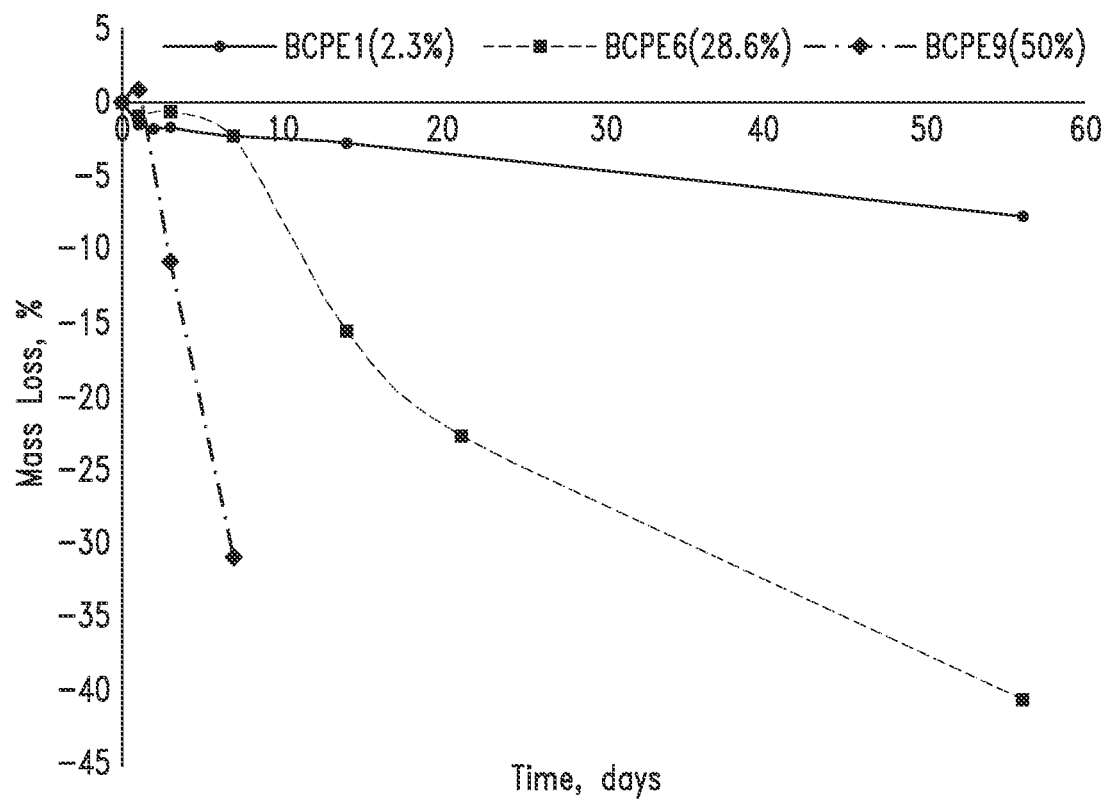
FIG. 6 shows effect of glycolide concentration on percent mass loss of photopolymerized polymer films of the present disclosure.
Figure 7:
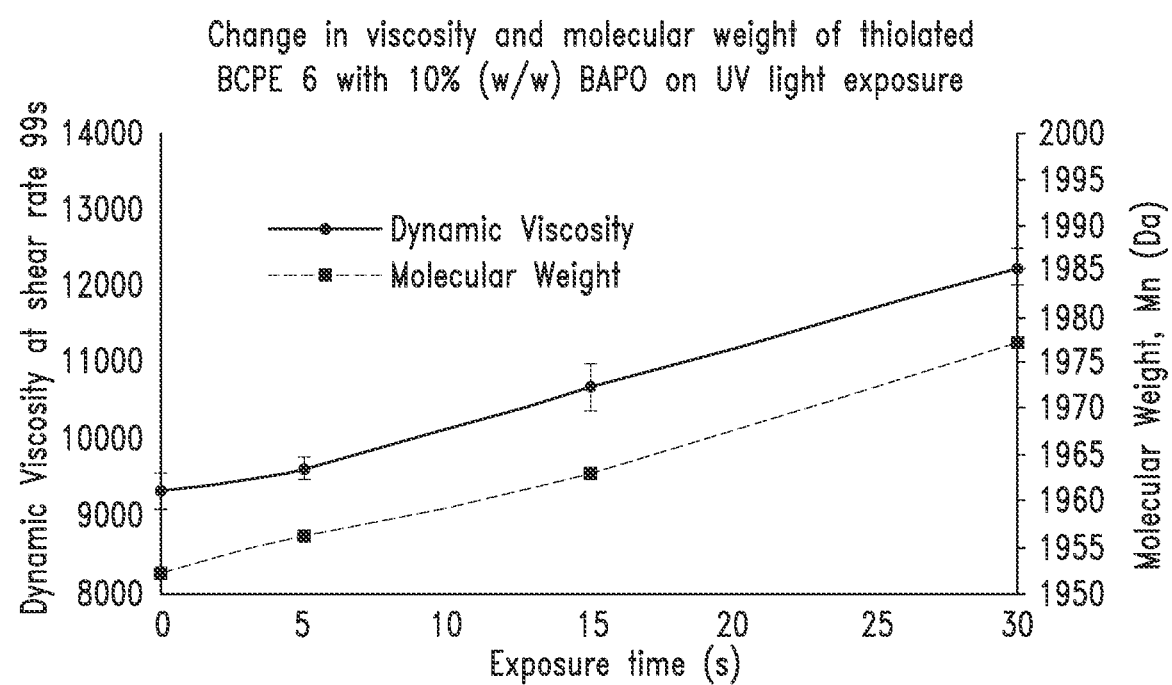
FIG. 7 is a graph showing an increase in dynamic viscosity and an increase in molecular weight of a thiolated polymer of the present disclosure after being exposed to increasing photocurable conditions.

Films produced under the conditions described in Example 3 were cut into rectangles with the dimensions of 75 mm (length) by 7.5 mm (width) by 0.75 mm (thickness). Each sample was weighed, and the mechanical properties were evaluated as outlined in Example 3. Samples were then placed in 15 ml of 0.1M phosphate buffer at pH 7.4. The rectangular samples were conditioned at 50° C. for time points of 1, 3, 7, 14, 21, and 56 days. At each time point, the specimens were patted dry and weighed. Afterwards, the samples were dried under vacuum until a constant weight was achieved. Each specimen's dry weight was measured, and intact samples were analyzed for mechanical properties as described in Example 3. In FIGS. 3-6, the results for strength loss, mass loss, and water content for select formulations are reported.

The increase in glycolide derived composition between the BCPE 4X and BCPE 6X to BCPE 9X has resulted in an increase in the compressive modulus for the films, where this may be due to a shift in the glass transition temperature of the materials.

Within the group of films prepared from the linear prepolymers, the modulus of BCPE 7X with the glycolide derived end graft is significantly higher than BCPE 5X with the glycolide derived central block. Also for films from linear prepolymers, the BCPE 7X (end regions are glycolide derived) films had a faster strength loss through 14 days in comparison to the BCPE 5X (center region is glycolide derived) films. However, the BCPE 5X (center region is glycolide derived) films had a higher strength loss at the last testable time point of 21 days.

Within the group of films prepared from triaxial prepolymers, the modulus of BCPE 6X with the glycolide derived end graft is not significantly greater than BCPE4X which has a glycolide derived central block. Also noteworthy is that the BCPE 6X (end region is glycolide derived) films had a faster strength loss than the BCPE 4X (center region is glycolide derived) films. The BCPE 6X films became untestable at 7 days while the BCPE 4X films lasted for an additional 7 days.

In comparing the BCPE 4X and BCPE 6X films' mass loss and water content, the BCPE 4X underwent greater mass loss than the BCPE 6X through 56 days. With the greater mass loss, it would have been expected that there would have been a greater water content in these samples, however this was not the case. When the caprolactone/TMC is strictly reacted onto the endgraft, greater mass loss is unexpectedly achieved with lower swelling and therefore lower water content. It may be that in both formulations, early degradation is occurring at the glycolide repeat unit. As described in Example 2, greater amounts of TMC/caprolactone are directly next to the methacrylate group when TMC/caprolactone end grafting is used. When this is the case, the polymer backbone will be less hydrophilic in comparison to when glycolide derived residues are next to the methacrylate group. The same results were observed when comparing the films BCPE 5X and BCPE 7X from the linear prepolymers of BCPE 5 and BCPE 7, respectively. It appears that the block structure or placement of monomer residues has a direct effect on resulting properties. If a relatively fast absorbing monomer residue (e.g., derived from glycolide) is placed at the end of the prepolymer arms, the corresponding crosslinked polymer will have a faster strength loss profile than compared to when glycolide residues are used to form a central block. If a relatively faster absorbing monomer residue (e.g., glycolide residue) is located in the center of the prepolymer, low water content at higher mass losses is observed which may be advantageous.

Example 5

Preparation of Thiolated Compound of the Present Disclosure

Generally Described by the Formula CC-[Arm-Q]

A 500 mL 3-neck round bottomed flask equipped with a mechanical stirrer and an addition funnel was charged with BCPE 6 (51.3 g; 0.0665 moles; see Table 1), thiolactic acid (17.243 mL; 20.623 g; 0.1943 moles) and dichloromethane (DCM) (200 mL) in a nitrogen environment. The contents of the reaction vessel were stirred at 200 rpm and the reaction vessel was cooled using an ice bath. Separately, N,N'-dicyclohexylcarbodiimide (DCC) (44.5 g, 0.2157 moles) was dissolved in 200 mL DCM. The DCC in DCM solution was then added to the reaction vessel drop wise using an addition funnel over a period of 30 minutes. After the addition of DCC/DCM solution had been completed, ice bath was removed. 4-Dimethylaminopyridine (DMAP) (2.366 g; 0.0193 moles) was added to the reaction vessel using a powder funnel. The reaction mixture was continued to stir in nitrogen environment at room temperature for 72 hours. DCM levels were replenished as it evaporated during the reaction. After 72 hours, the reaction mixture was filtered under suction. The filtrate was washed with 2×100 mL 0.25 M HCl and 1×100 mL deionized (DI) water. The organic phase from the extraction was dried over activated molecular sieves (3 Å) for 18 hours after which it was filtered under suction. The solvent was removed under vacuum on a rotary evaporator to get a liquid polymeric product (BCPE 6-TLA). The amorphous liquid polymer, thus obtained, was characterized by 1H NMR spectroscopy, rheometry (viscosity=7690 at shear rate of 99 s$^{-1}$), and gel permeation chromatography (Mn=1952 Da, PDI=1.62).

Example 6

Photopolymerization of Thiolated Polymer of the Present Disclosure

Thiolated BCPE 6 polymer (BCPE 6-TLA) from Example 5 was mixed with 10% (w/w) of phenylbis(2,4,6-trimethylbenzoyl)phosphine oxide (BAPO) photoinitiator and exposed to UV light at 60 mW/cm$^2$ intensity using a Dymax Bluewave 200 UV Light-Curing Spot Lamp System for a duration of 0-30 seconds. The photo-exposed samples were analyzed using rheometry and gel permeation chromatography. The analysis showed an increasing trend in both viscosity and molecular weight with an increasing duration of exposure of the polymer/BAPO mixture to UV light.

Example 7

Preparation of Thiolated Compound of the Present Disclosure

Generally Described by the Formula CC-[Arm-Q]

Polymers which have hydroxyl groups can be capped with a moiety that replaces the hydroxyl group with a carboxylic acid group. The carboxylic acid groups can then be substituted with a thiol containing moiety via an amide or ester bond depending on the functional unit of the substituent employed for bonding. For instance, the hydroxyl end groups of a BCPE prepolymer (see, e.g., Table 1) can be reacted with succinic anhydride to form a succinated intermediate (BCPE-SA), which may in turn be reacted with the amine group present in cysteine to provide a product (BCPE 6-SA-Cys) having terminal free thiol groups. This approach is illustrated by the present example.

Part 1—formation of BCPE 6-SA: A 250 mL 3-neck round bottomed flask was charged with BCPE 6 (48.9 g; 0.0633 moles, Table 1). The system was placed under vacuum (<0.5 torr) at 40° C. for 18 hours to dry the pre-polymer. After 18 hours, the system was purged with nitrogen and succinic anhydride (19.0 g; 0.1900 moles) was added to the reaction vessel. The reaction mixture was stirred at 50 rpm at 120° C. for 24 hours. The polymer thus obtained was cooled to room temperature and devolatilized on rotary evaporator to remove residual monomer at room temperature for 18 hours and further 24 hours at 110° C. The structure of the resulting clear amorphous polymer product was confirmed using $^1$H NMR.

Part 2—formation of BCPE 6-SA-Cys: A 100 mL 2-neck flask was charged with BCPE 6-SA (10.1 g; 0.0093 moles), L-cysteine (3.39 g; 0.0280 moles) and dichloromethane (DCM) (30 mL). The reactants were stirred at 200 rpm in nitrogen environment. Separately, N'-dicyclohexylcarbodiimide (DCC) (6.35 g, 0.0307 moles) was dissolved in 10 mL DCM. An ice bath was placed around the reaction vessel and DCC/DCM solution was added dropwise. The ice bath was removed after the addition of DCC/DCM solution had been completed and the reactants were allowed to stir at room temperature for 72 hours in nitrogen environment. After 72 hours, the reaction mixture was diluted with 50 mL DCM and filtered under suction. The filtrate was washed with 2×50 mL 0.25 M HCl and 1×50 mL DI water. The organic phase from the extraction was dried over activated molecular sieves (3 Å) for 18 hours after which it was filtered under suction. The solvent was removed under vacuum on a rotary evaporated to provide a waxy polymeric product (BCPE 6-SA-Cys), the structure of which was confirmed by 1H NMR spectroscopy.

Example 8

Printing SLA Formulation Articles

A three dimensional object was created using the Solidworks® computer program (Solidworks Corp.) of a rectangular cuboid. The three dimensional object file was converted to a STL file. The formulation used for this print was 41.6 wt. % BCPE 5, 41.6 wt % PEGDA, 0.2 wt % Irgacure® TPO-L, and 16.6 wt % polyglycolide microparticles. This formulation was added to the ink bed of a B9 Creator v1.2 SLA printer. The object was printed at a 30 µm layer thickness with an exposure time of 6 s for the first two layers and 3 s for subsequent layers. The light intensity of the SLA printer was 3 mW/cm$^2$ when measured by a UVA detector.

All references disclosed herein, including patent references and non-patent references, are hereby incorporated by reference in their entirety as if each was incorporated individually.

It is to be understood that the terminology used herein is for the purpose of describing specific embodiments only and is not intended to be limiting. It is further to be understood that unless specifically defined herein, the terminology used herein is to be given its traditional meaning as known in the relevant art.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents, i.e., one or more, unless the content and context clearly dictates otherwise. For example, "a" macromer refers to "one or more" macromers, which may also be referred to as "at least one" macromer. It should also be noted that the conjunctive terms, "and" and "or" are generally employed in the broadest sense to include "and/or" unless the content and context clearly dictates inclusivity or exclusivity as the case may be. Thus, the use of the alternative (e.g., "or") should be understood to mean either one, both, or any combination thereof of the alternatives. In addition, the composition of "and" and "or" when recited herein as "and/or" is intended to encompass an embodiment that includes all of the associated items or ideas and one or more other alternative embodiments that include fewer than all of the associated items or ideas.

Unless the context requires otherwise, throughout the specification and claims that follow, the word "comprise" and synonyms and variants thereof such as "have" and "include", as well as variations thereof such as "comprises" and "comprising" are to be construed in an open, inclusive sense, e.g., "including, but not limited to." The term "consisting essentially of" limits the scope of a claim to the specified materials or steps, or to those that do not materially affect the basic and novel characteristics of the claimed invention.

It should also be understood that when something is to be "selected from" two or more named options, that is a reference to selecting one or two or all of the named options, so that, for example, if a monomer (where, as mentioned above, "a" monomer is a reference to at least one monomer) is to be selected from TMC and CAP, that is a disclosure to select TMC or CAP or the combination of CAP and TMC. Furthermore, when a compound or composition or method etc. comprises listed features, those features may be supplemented by additional features. For example, in a method comprising listed features, and a listed feature is to select a monomer from TMC and CAP, the selected monomer(s) will necessarily include at least one of TMC and CAP, but may also include one or more other, i.e., non-listed, monomers.

Any headings used within this document are only being utilized to expedite its review by the reader, and should not be construed as limiting the invention in any manner. Thus, the headings and Abstract of the Disclosure provided herein are for convenience only and do not interpret the scope or meaning of the embodiments.

Where a range of values is provided herein, it is understood that each intervening value, to the tenth of the unit of the lower limit unless the context clearly dictates otherwise, between the upper and lower limit of that range and any other stated or intervening value in that stated range is encompassed within the disclosure and claims. The upper and lower limits of these smaller ranges may independently be included in the smaller ranges is also encompassed, subject to any specifically excluded limit in the stated range. Where the stated range includes one or both of the limits, ranges excluding either or both of those included limits are also included in the disclosure and claims.

For example, any concentration range, percentage range, ratio range, or integer range provided herein is to be understood to include the value of any integer within the recited range and, when appropriate, fractions thereof (such as one tenth and one hundredth of an integer), unless otherwise indicated. Also, any number range recited herein relating to any physical feature, such as polymer subunits, size or thickness, are to be understood to include any integer within the recited range, unless otherwise indicated. As used herein, the term "about" means±20% of the indicated range, value, or structure, unless otherwise indicated.

All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Such documents may be incorporated by reference for the purpose of describing and disclosing, for example, materials and methodologies described in the publications, which might be used in connection with the presently claimed invention. The publications discussed above and throughout the text are provided solely for their disclosure prior to the filing date of the present application. Nothing herein is to be construed as an admission that the inventors are not entitled to antedate any referenced publication by virtue of prior invention.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Applicants reserve the right to physically incorporate into this specification any and all materials and information from any such patents, publications, scientific articles, web sites, electronically available information, and other referenced materials or documents.

Furthermore, the written description portion of this patent includes all claims. Furthermore, all claims, including all original claims as well as all claims from any and all priority documents, are hereby incorporated by reference in their entirety into the written description portion of the specification, and Applicants reserve the right to physically incorporate into the written description or any other portion of the application, any and all such claims. Thus, for example, under no circumstances may the patent be interpreted as allegedly not providing a written description for a claim on the assertion that the precise wording of the claim is not set forth in haec verba in written description portion of the patent.

The following are some additional exemplary embodiments provided by the present disclosure:

1) A photopolymerizable compound comprising a polyaxial central core (CC) and 2-4 arms of the formula (A)-(B) or (B)-(A) extending from the central core, where at least one of the arms comprise a light-reactive functional group (Q) and (A) is the ring-opening polymerization product from a monomer selected from trimethylene carbonate (T) and ε-caprolactone (C), while (B) is the ring-opening polymerization product from a monomer selected from glycolide, lactide and p-dioxanone.
2) A light-curable composition comprising one or more photopolymerizable compounds of embodiment 1, optionally further comprising a photoinitiator.
3) A light-reactive polyaxial macromer comprising a central core (CC) and 2-4 arms extending from the central core, where at least one of the arms comprises a light-reactive functional group (Q) and a block copolymer comprising blocks A and B; wherein
   a. block A comprises residues formed from at least one of trimethylene carbonate (TMC) and ε-caprolactone (CAP); and
   b. block B comprises residues formed from at least one of glycolide, lactide and p-dioxanone.
4) A light-curable composition comprising one or more macromers of embodiment 3, optionally further comprising a photoinitiator.
5) A prepolymer of the photopolymerizable compound of embodiment 1, wherein the central core (CC) is joined to (A) of one or more arms of formula (A)-(B), and (B) comprises a hydroxyl end group.
6) A prepolymer of the photopolymerizable compound of embodiment 1, wherein the central core (CC) is joined to (B) of one or more arms of formula (B)-(A), and (A) comprises a hydroxyl end group. Thus, the prepolymer comprises a polyaxial central core (CC) and 2-4 arms of the formula (A)-(B) or (B)-(A) extending from the central core, where at least one of the arms comprise a hydroxyl end group (i.e., a hydroxyl group at the end of the arm furthest from the central core) and (A) is the ring-opening polymerization product from a monomer selected from trimethylene carbonate (T) and ε-caprolactone (C), while (B) is the ring-opening polymerization product from a monomer selected from glycolide, lactide and p-dioxanone.
7) The compound of embodiment 1 which is reactive when exposed to UV radiation.
8) The compound of embodiment 1 which comprises a structure CC-[A-B-Q]$_2$.
9) The compound of embodiment 1 which comprises a structure CC-[A-B-Q]$_3$.
10) The compound of embodiment 1 which comprises a structure CC-[A-B-Q]$_4$.
11) The compound of embodiment 1 which comprises a structure CC-[B-A-Q]$_2$.
12) The compound of embodiment 1 which comprises a structure CC-[B-A-Q]$_3$.
13) The compound of embodiment 1 which comprises a structure CC-[B-A-Q]$_4$.
14) The composition of any of embodiments 1-7 wherein the macromer has four arms, a molecular mass of less than 40,000 g/mol, and is a solid at room temperature.
15) The composition of any of embodiments 1-7 wherein the macromer has three arms, a molecular mass of less than 5,000 g/mol, and is a liquid at room temperature.
16) The composition of any of embodiments 1-7 where the macromer has two arms, a molecular mass of less than 5,000 g/mol, and is a liquid at room temperature.
17) The composition of any of embodiments 1-16 further comprising CC-[A-B-Q]n and n is 1.
18) The composition of any of embodiments 1-16 further comprising at least one of CC-Q, CC-A-Q, and CC—B-Q.
19) The composition of any of embodiments 1-16 further comprising at least one of Q-A, Q-B and Q-CC.
20) The composition of any of claims 1-19 wherein Q comprises a thiol group.
21) The composition of any of claims 1-19 wherein Q comprises a vinyl group.
22) The composition of embodiment 21 wherein the vinyl group is an acrylate group or a methacrylate group.
23) The composition of any of embodiments 1-22 wherein block A comprises residues formed from TMC.
24) The composition of any of embodiments 1-22 wherein block A comprises residues formed from CAP.
25) The composition of any of embodiments 1-22 wherein block A comprises residues formed from both TMC and CAP.
26) The composition of any of embodiments 1-22 wherein at least 90% of the residues in block A are residues formed from TMC or CAP.
27) The composition of any of embodiments 1-22 wherein the macromer comprises 2-45 residues formed from TMC.
28) The composition of any of embodiments 1-22 wherein the macromer comprises 2-15 residues formed from TMC.
29) The composition of any of embodiments 1-22 wherein the macromer comprises 2-10 residues formed from TMC.
30) The composition of any of embodiments 1-26 wherein block A has a molecular weight of from 102-2500 g/mol.
31) The composition of any of embodiments 1-26 wherein block A has a molecular weight of 102-1000 g/mol.
32) The composition of any of embodiments 1-26 wherein block A has a molecular weight of 102-900 g/mol.
33) The composition of any of embodiments 1-26 wherein each A block comprises 2-45 monomer residues.
34) The composition of any of embodiments 1-26 wherein each A block comprises 2-15 monomer residues.
35) The composition of any of embodiments 1-26 wherein each A block comprises 2-10 monomer residues.
36) The composition of any of embodiments 1-35 wherein each B block comprise 2-45 monomer residues.
37) The composition of any of embodiments 1-35 wherein each B block comprise 2-15 monomer residues.
38) The composition of any of embodiments 1-35 wherein each B block comprises 2-15 monomer residues.
39) The composition of any of embodiments 1-36 wherein the block copolymer has a molecular mass of less than 40,000 g/mol.
40) The composition of any of embodiments 1-36 wherein the block copolymer has a molecular mass of less than 25,000 g/mol.
41) The composition of any of embodiments 1-36 wherein the block copolymer has a molecular mass of less than 10,000 g/mol.

42) The composition of any of embodiments 1-41 having a viscosity at room temperature of less than 50,000 cps.
43) The composition of any of embodiments 1-41 having a viscosity at room temperature of less than 30,000 cps.
44) The composition of any of embodiments 1-41 having a viscosity at room temperature of less than 20,000 cps.
45) The composition of any of embodiments 1-44 further comprising a photoinitiator.
46) The composition of any of embodiments 1-45 further comprises a reactive diluent such a PEG-diacrylate (PEG-DA).

Other nonlimiting embodiments are within the following claims. The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

The patent may not be interpreted to be limited to the specific examples or nonlimiting embodiments or methods specifically and/or expressly disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A photopolymerizable compound comprising:
a polyaxial central core (CC) and 2-4 arms of the formula (A)-(B) or (B)-(A) extending from the central core, where
at least one of the arms comprises a light-reactive functional group (Q) comprising a thiol group, an acrylate group, or a methacrylate group,
(A) is the ring-opening polymerization product from a monomer selected from trimethylene carbonate (T) and caprolactone (CAP), and
(B) is the ring-opening polymerization product of a monomer of at least one of glycolide, lactide, or p-dioxanone.

2. A light-curable composition comprising one or more photopolymerizable compounds of claim 1 and a photoinitiator.

3. The compound of claim 1, comprising CC-[A-B-Q]$_2$, CC-[A-B-Q]$_3$, CC-[A-B-Q]$_4$, CC-[B-A-Q]$_2$, CC-[B-A-Q]$_3$, or CC-[B-A-Q]$_4$.

4. The compound of claim 1, comprising a compound of the formula CC-[A-B-Q]n and n is 1.

5. The compound of claim 1, comprising at least one compound comprising CC-Q, CC-A-Q, or CC-B-Q.

6. The compound of claim 3, further comprising at least one compound of Q-A, Q-B, or Q-CC.

7. The compound of claim 1, wherein Q comprises a thiol group.

8. The compound of claim 1, wherein Q comprises an acrylate group or a methacrylate group.

9. The compound of claim 3, wherein Q comprises a thiol group.

10. The compound of claim 3, wherein Q comprises an acrylate group or a methacrylate group.

11. The compound of claim 1, wherein at least one of the arms comprises a terminal hydroxyl group.

12. The compound of claim 3, wherein at least one of the arms comprises a terminal hydroxyl group.

13. The composition of claim 2, wherein the compound comprises CC-[A-B-Q]$_2$, CC-[A-B-Q]$_3$, CC-[A-B-Q]$_4$, CC-[B-A-Q]$_2$, CC-[B-A-Q]$_3$, or CC-[B-A-Q]$_4$.

14. The composition of claim 2, further comprising a compound of the formula CC-[A-B-Q]n and n is 1.

15. The composition of claim 2, further comprising at least one compound comprising CC-Q, CC-A-Q, or CC-B-Q.

16. The composition of claim 2, further comprising at least one compound of Q-A, Q-B, or Q-CC.

17. The composition of claim 2, wherein Q comprises a thiol group.

18. The composition of claim 2, wherein Q comprises an acrylate group or a methacrylate group.

19. The composition of claim 2, wherein at least one of the arms comprises a terminal hydroxyl group.

* * * * *